US012563278B2

(12) United States Patent
Argaw et al.

(10) Patent No.: US 12,563,278 B2
(45) Date of Patent: Feb. 24, 2026

(54) SYSTEMS AND METHODS FOR VIDEO SUMMARIZATION

(71) Applicant: ADOBE INC., San Jose, CA (US)

(72) Inventors: Dawit Mureja Argaw, Daejeon (KR); Seunghyun Yoon, San Jose, CA (US); Fabian David Caba Heilbron, San Jose, CA (US); Hanieh Deilamsalehy, Seattle, WA (US); Trung Huu Bui, San Jose, CA (US); Zhaowen Wang, San Jose, CA (US); Franck Dernoncourt, Seattle, WA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 18/747,757

(22) Filed: Jun. 19, 2024

(65) Prior Publication Data

US 2025/0392797 A1 Dec. 25, 2025

(51) Int. Cl.
*H04N 21/8549* (2011.01)

(52) U.S. Cl.
CPC .............................. *H04N 21/8549* (2013.01)

(58) Field of Classification Search
CPC ................................................ H04N 21/8549
See application file for complete search history.

(56) References Cited

U.S. PATENT DOCUMENTS 9,286,938 B1 * 3/2016 Tseytlin ............... G11B 27/031
10,424,341 B2 * 9/2019 Thornton ......... G08B 13/19682
10,541,000 B1 * 1/2020 Karakotsios ..... H04N 21/25891
10,825,227 B2 * 11/2020 Amer ..................... G06N 3/044
10,945,040 B1 * 3/2021 Bedi ....................... G10L 15/26
11,910,073 B1 * 2/2024 Sharma .............. H04N 21/8549
12,283,291 B1 * 4/2025 Sarfati ............... H04N 21/8106
12,301,960 B1 * 5/2025 Ben-Cohen ........ H04N 21/8456
2003/0152363 A1 * 8/2003 Jeannin ................ G11B 27/005
2015/0350747 A1 * 12/2015 Jackson ................. G06V 20/47 725/38
2016/0014482 A1 * 1/2016 Chen .................. H04N 21/8456 386/241
2016/0070963 A1 * 3/2016 Chakraborty ..... G06F 18/24133 386/241
2018/0189570 A1 * 7/2018 Paluri .................... G06F 18/24
(Continued)

OTHER PUBLICATIONS

1Alhojely, et al., "Recent Progress on Text Summarization", In 2020 International Conference on Computational Science and Computational Intelligence (CSCI), pp. 1503-1509, Dec. 2020, 7 pages.
(Continued)

*Primary Examiner* — Fernando Alcon
(74) *Attorney, Agent, or Firm* — F. CHAU & ASSOCIATES, LLC

(57) ABSTRACT

A method, apparatus, non-transitory computer readable medium, and system for video summarization include obtaining a video, generating a sequence of contextualized visual representations corresponding to portions of the video, generating a sequence of summary visual representations corresponding to a subset of the portions of the video based on the sequence of contextualized visual representations, and generating a summary video including the subset of the portions of the video based on the sequence of summary visual representations.

20 Claims, 9 Drawing Sheets

(56) References Cited

U.S. PATENT DOCUMENTS

| | | | | |
|---|---|---|---|---|
| 2018/0268253 | A1* | 9/2018 | Hoffman | G06V 10/761 |
| 2018/0295428 | A1* | 10/2018 | Bi | H04N 21/8153 |
| 2019/0180109 | A1* | 6/2019 | Sinha | H04N 21/4223 |
| 2019/0325084 | A1* | 10/2019 | Peng | G06F 16/243 |
| 2019/0377955 | A1* | 12/2019 | Swaminathan | H04N 21/23418 |
| 2020/0186852 | A1* | 6/2020 | Ramamurthy | H04N 21/47202 |
| 2020/0196028 | A1* | 6/2020 | Kuehne, Jr. | G06N 3/044 |
| 2021/0392414 | A1* | 12/2021 | Javan Roshtkhari | H04N 21/4781 |
| 2022/0067385 | A1* | 3/2022 | Kaushik | G06V 20/47 |
| 2022/0078530 | A1* | 3/2022 | Zhu | H04N 21/6581 |
| 2022/0130427 | A1* | 4/2022 | Allibhai | G10L 25/57 |
| 2022/0353101 | A1* | 11/2022 | Hu | H04L 12/1822 |
| 2022/0414338 | A1* | 12/2022 | Cho | G06F 40/30 |
| 2023/0401389 | A1* | 12/2023 | Shmuel | G06F 40/40 |
| 2024/0205520 | A1* | 6/2024 | Carbajo | G10L 15/26 |
| 2024/0395042 | A1* | 11/2024 | Boiarov | G06V 10/774 |
| 2024/0406521 | A1* | 12/2024 | Ramesh | H04N 21/8549 |
| 2025/0054306 | A1* | 2/2025 | Cohen | G06V 10/70 |
| 2025/0124689 | A1* | 4/2025 | Williams | G06V 10/764 |

OTHER PUBLICATIONS

2Bain, et al., "WhisperX: Time-Accurate Speech Transcription of Long-Form Audio", arXiv preprint arXiv:2303.00747v2 [cs.SD] Jul. 11, 2023, 6 pages.
3Bubeck, et al., "Sparks of Artificial General Intelligence: Early Experiments with GPT-4", arXiv preprint arXiv:2303.12712v5 [cs.CL] Apr. 13, 2023, 155 pages.
4Devlin, et al., "Bert: Pre-training of Deep Bidirectional Transformers for Language Understanding", arXiv preprint arXiv:1810.04805v2 [cs.CL] May 24, 2019, 16 pages.
5Elhamifar, et al., "See All by Looking at a Few: Sparse Modeling for Finding Representative Objects", In 2012 IEEE Conference on Computer Vision and Pattern Recognition, pp. 1600-1607, Jun. 2012, available at https://ieeexplore.ieee.org/document/6247852.
6Gholamrezazadeh, et al., "A Comprehensive Survey on Text Summarization Systems", In 2009 2nd International Conference on Computer Science and its Applications, pp. 1-6, Jun. 2009, 6 pages.
7Gygli, et al., "Creating Summaries from User Videos", In ECCV 2014, Part VII, LNCS 8695, pp. 505-520, Sep. 2014, 16 pages.
8He, et al., "Align and Attend: Multimodal Summarization with Dual Contrastive Losses", arXiv preprint arXiv:2303.07284v3 [cs.CV] Jun. 12, 2023, 15 pages.
9Ji, et al., "Video Summarization with Attention-Based Encoder-Decoder Networks", arXiv preprint arXiv:1708.09545v2 [cs.CV] Apr. 16, 2018, 9 pages.
10Jiang , et al., "Joint Video Summarization and Moment Localization by Cross-Task Sample Transfer", In Proceedings of the IEEE/CVF Conference on Computer Vision and Pattern Recognition, pp. 16388-16398, Jun. 2022, 11 pages.
11Jung, et al., "Discriminative Feature Learning for Unsupervised Video Summarization", arXiv preprint arXiv:1811.09791v1 [cs.CV] Nov. 24, 2018, 8 pages.
12Kanehira, et al., "Viewpoint-aware Video Summarization", In Proceedings of the IEEE Conference on Computer Vision and Pattern Recognition, pp. 7435-7444, Jun. 2018, 10 pages.
13Kendall, "The treatment of ties in ranking problems", Biometrika, 33(3): 239-251, 1945, available at https://www.jstor.org/stable/2332303.
14Lee, et al., "Discovering Important People and Objects for Egocentric Video Summarization", Preprint, To Appear In Proceedings of the IEEE Conference on Computer Vision and Pattern Recognition (CVPR), 2012, 8 pages.
15Lewis, et al., "Bart: Denoising Sequence-to-Sequence Pre-training for Natural Language Generation, Translation, and Comprehension", arXiv preprint arXiv:1910.13461v1 [cs.CL] Oct. 29, 2019, 10 pages.
16Lin, et al., "VideoXum: Cross-modal Visual and Textural Summarization of Videos", arXiv preprint arXiv:2303.12060v3 [cs.CV] Apr. 23, 2024, 13 pages.
17Liu et al., "Text Summarization with Pretrained Encoders", arXiv preprint arXiv:1908.08345v2 [cs.CL] Sep. 5, 2019, 11 pages.
18Liu, et al., "RoBERTa: A Robustly Optimized BERT Pretraining Approach", arXiv preprint arXiv:1907.11692v1 [cs.CL] Jul. 26, 2019, 13 pages.
19Loshchilov, et al., "Decoupled Weight Decay Regularization", arXiv preprint arXiv:1711.05101v3 [cs.LG] Jan. 4, 2019, 19 pages.
20Lu, et al., "A Bag-of-Importance Model With Locality-Constrained Coding Based Feature Learning for Video Summarization", IEEE Transactions on Multimedia, 16(6): 1497-1509, Oct. 2014, available at https://ieeexplore.ieee.org/document/6804698.
21Manyika, "An overview of Bard: an early experiment with generative AI", 2023, available at https://ai.google/static/documents/google-about-bard.pdf.
22Miech, et al., "HowTo100M: Learning a Text-Video Embedding by Watching Hundred Million Narrated Video Clips", arXiv preprint arXiv:1906.03327v2 [cs.CV] Jul. 31, 2019, 14 pages.
23Mihalcea, et al., "TextRank: Bringing Order into Texts", In Proceedings of the 2004 Conference on Empirical Methods in Natural Language Processing, pp. 404-411, Jul. 2004, 8 pages.
24Narasimhan, et al., "CLIP-It! Language-Guided Video Summarization", arXiv preprint arXiv:2107.00650v2 [cs.CV] Dec. 8, 2021, 15 pages.
25Narasimhan, et al., "TL;DW? Summarizing Instructional Videos with Task Relevance and Cross-Modal Saliency", arXiv preprint arXiv:2208.06773v1 [cs.CV] Aug. 14, 2022, 24 pages.
26OpenAI, "GPT-4 Technical Report", arXiv preprint arXiv:2303.08774v6 [cs.CL] Mar. 4, 2024, 100 pages.
27Ouyang, et al., "LLM is Like a Box of Chocolates: the Non-determinism of ChatGPT in Code Generation", arXiv preprint arXiv:2308.02828v1 [cs.SE] Aug. 5, 2023, 12 pages.
28Qiu, et al., "MMSum: A Dataset for Multimodal Summarization and Thumbnail Generation of Videos", arXiv preprint arXiv:2306.04216v2 [cs.CV] Nov. 19, 2023, 28 pages.
29Radford, et al., "Learning Transferable Visual Models from Natural Language Supervision", arXiv preprint arXiv:2103.00020v1 [cs.CV] Feb. 26, 2021, 48 pages.
30Radford, et al., "Robust Speech Recognition via Large-Scale Weak Supervision", arXiv preprint arXiv:2212.04356v1 [eess.AS] Dec. 6, 2022, 28 pages.
31Reimers, et al., "Sentence-BERT: Sentence Embeddings using Siamese BERT-Networks", arXiv preprint arXiv:1908.10084v1 [cs.CL] Aug. 27, 2019, 11 pages.
32Sharghi, et al., "Query-Focused Extractive Video Summarization", arXiv preprint arXiv:1607.05177v1 [cs.CV] Jul. 18, 2016, 18 pages.
33Sharghi, et al., "Query-Focused Video Summarization: Dataset, Evaluation, and A Memory Network Based Approach", arXiv preprint arXiv:1707.04960v1 [cs.CV] Jul. 16, 2017, 10 pages.
34Song, et al., "TVSum: Summarizing Web Videos Using Titles", In Proceedings of the IEEE Conference on Computer Vision and Pattern Recognition, pp. 5179-5187, 2015, 9 pages.
35Touvron, et al., "Training data-efficient image transformers & distillation through attention", arXiv preprint arXiv:2012.12877v2 [cs.CV] Jan. 15, 2021, 22 pages.
36Touvron, et al., "Llama 2: Open Foundation and Fine-Tuned Chat Models", arXiv preprint arXiv:2307.09288v2 [cs.CL] Jul. 19, 2023, 77 pages.
37Vaswani, et al., "Attention Is All You Need", arXiv:1706.03762v7 [cs.CL] Aug. 2, 2023, 15 pages.
38Wang, et al., "Element-aware Summarization with Large Language Models: Expert-aligned Evaluation and Chain-of-Thought Method", arXiv preprint arXiv:2305.13412v1 [cs.CL] May 22, 2023, 24 pages.
39Zhang, et al., "PEGASUS: Pre-training with Extracted Gap-sentences for Abstractive Summarization", arXiv preprint arXiv:1912.08777v3 [cs.CL] Jul. 10, 2020, 55 pages.
40Zhang, et al., "Benchmarking Large Language Models for News Summarization", arXiv preprint arXiv:2301.13848v1 [cs.CL] Jan. 31, 2023, 14 pages.

(56) References Cited

OTHER PUBLICATIONS

41Zhao, et al., “Quasi Real-Time Summarization for Consumer Videos”, In CVPR 2014, 8 pages.
42Zhao, et al., “HSA-RNN: Hierarchical Structure-Adaptive RNN for Video Summarization”, In Proceedings of the IEEE Conference on Computer Vision and Pattern Recognition, pp. 7405-7414, 2018, 10 pages.
43Zhao, et al., “Reconstructive Sequence-Graph Network for Video Summarization”, arXiv preprint arXiv:2105.04066v1 [cs.CV] May 10, 2021, 10 pages.
44Zhong, et al., “Can LLM Replace Stack Overflow? A Study on Robustness and Reliability of Large Language Model Code Generation”, arXiv preprint arXiv:2308.10335v5 [cs.CL] Jan. 27, 2024, 9 pages.
45Zhu, et al., “DSNet: A Flexible Detect-to-Summarize Network for Video Summarization”, in IEEE Transactions on Image Processing, vol. 30, pp. 948-962, 2021, available at https://ieeexplore.ieee.org/document/9275314.

* cited by examiner

Obtain a video — 805

Generate a sequence of contextualized visual representations corresponding to portions of the video — 810

Generate a sequence of summary visual representations corresponding to a subset of the portions of the video based on the sequence of contextualized visual representations — 815

Generate a summary video including the subset of the portions of the video based on the sequence of summary visual representations — 820

800

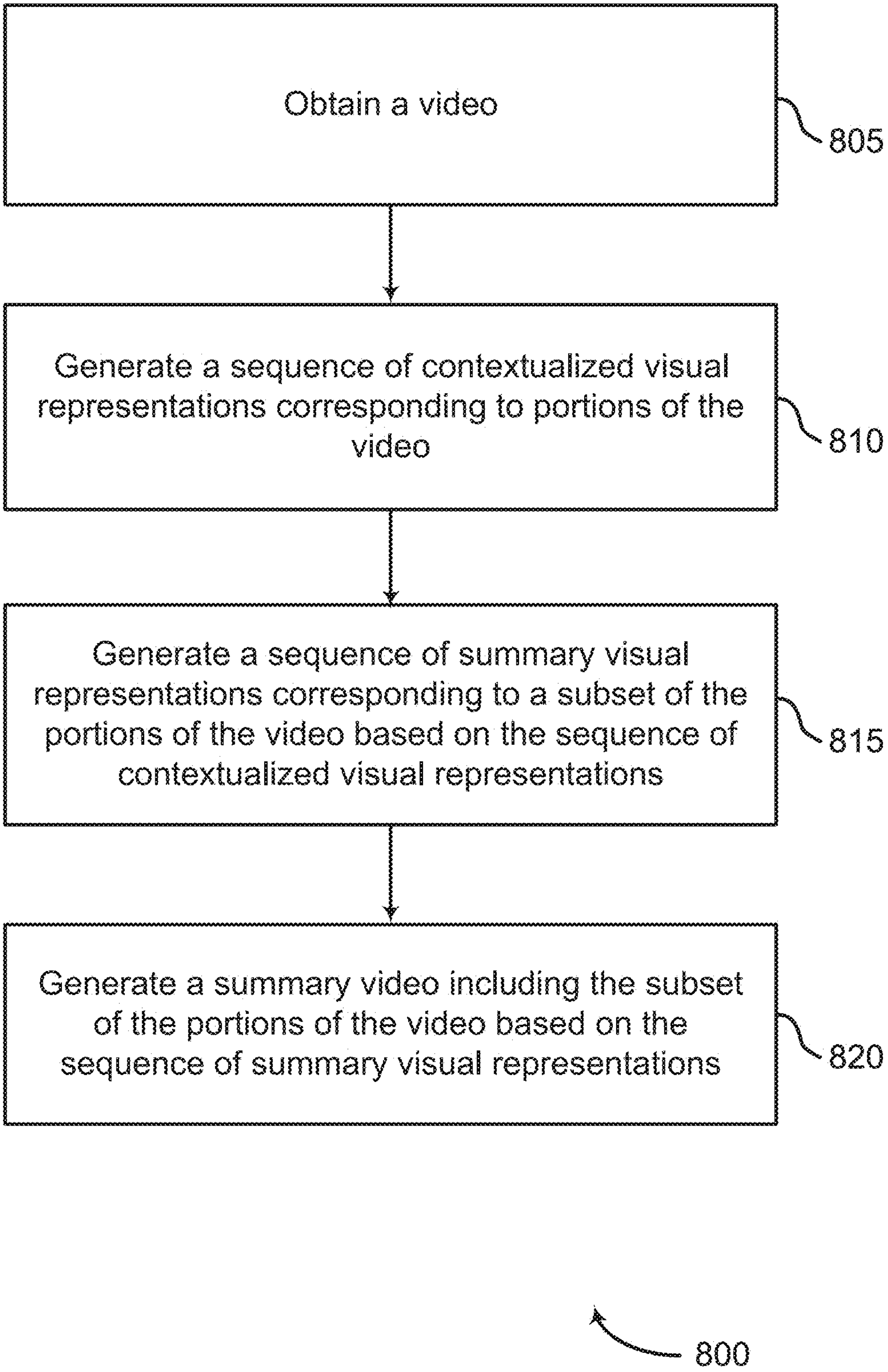

FIG. 8

Obtain a training set including a training video and a target summary video ⟍905

Generate a sequence of contextualized visual representations corresponding to portions of the training video ⟍910

Generate a sequence of target visual representations of the target summary video ⟍915

Generate a sequence of summary visual representations corresponding to a subset of the portions of the training video based on the sequence of contextualized visual representations ⟍920

Update parameters of a video summarization model based on the sequence of summary visual representations and the sequence of target visual representations ⟍925

900

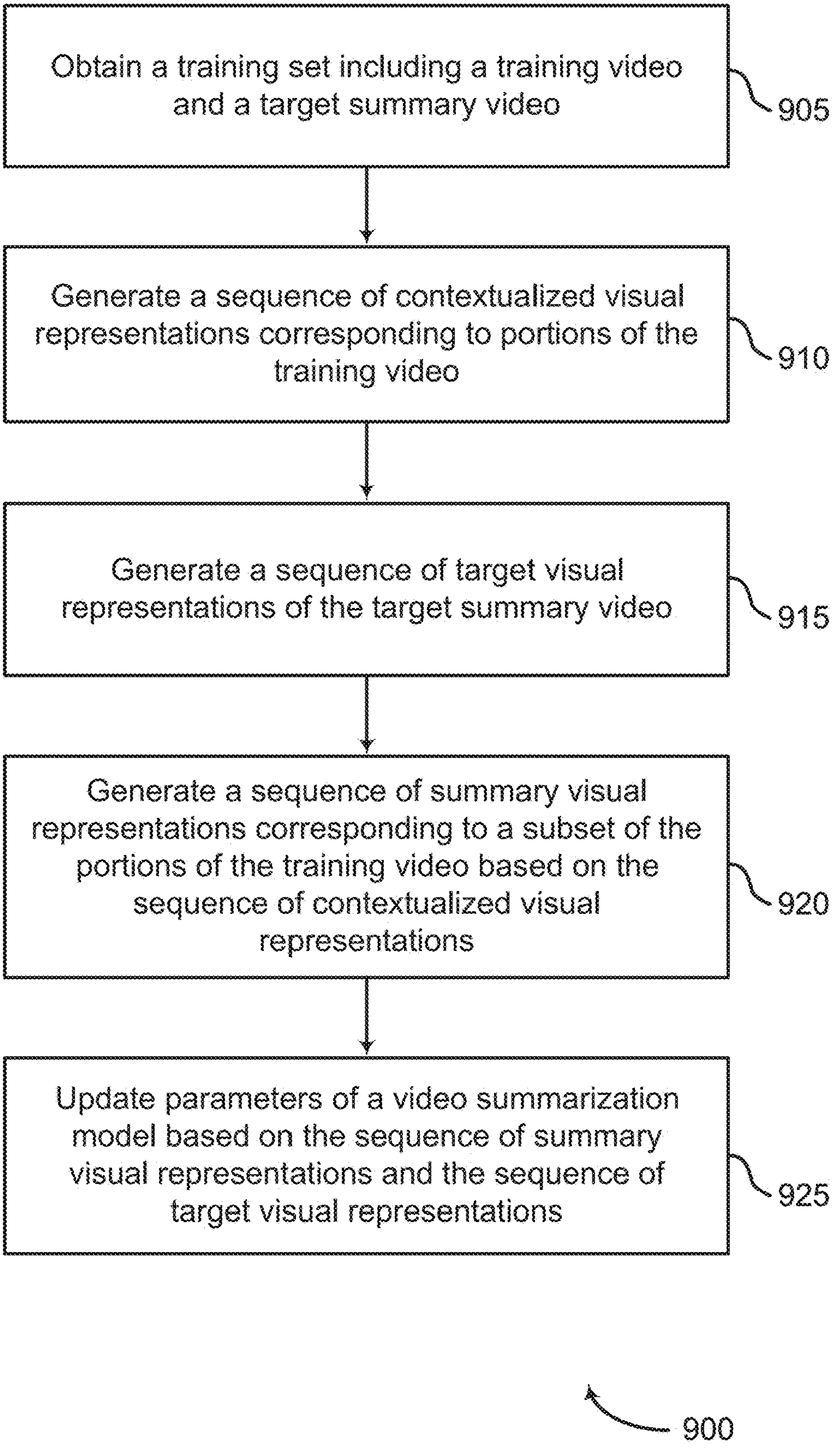

FIG. 9

SYSTEMS AND METHODS FOR VIDEO SUMMARIZATION

BACKGROUND

The following relates generally to machine learning, and more specifically to video summarization. Machine learning algorithms build a model based on sample data, known as training data, to make a prediction or a decision in response to an input without being explicitly programmed to do so. For example, a machine learning model may summarize a video by selecting summary moments from the video that the machine learning model predicts to be representative of the meaning of the video as a whole.

However, the effectiveness of conventional video summarization systems is constrained both by a relatively small amount of existing training data and by an approach taken for the video summarization task. For example, conventional video processing systems use a binary classifier model to classify each frame of a video as being either a summary moment or a non-summary moment. Such binary classifier models are trained using relatively small datasets, resulting in a tendency to overfit to available training examples. Accordingly, the binary classifier models lack an ability to make accurate predictions for videos that do not fit the training data for the models.

Furthermore, such binary classifier models make a prediction of whether a video frame of a sequence of video frames is a summary moment or a non-summary moment independently of how previous video frames of the sequence of video frames have been classified, potentially leading to numerous repetitive video frames being categorized as summary moments. There is therefore a need in the art for a video processing system that can perform video summarization with increased accuracy.

SUMMARY

Systems and methods are described for summarizing an input video by generating a summary video including one or more representative clips from the input video. In one example, a video processing system uses the video summarization model to generate representations of the input video, and uses the representations to generate further representations of summary moments of the input video. The video processing system then generates the summary video based on the further representations.

In some embodiments, the video processing system uses an autoregressive process, where a generation of a feature representation of a frame at a given time step t of the input video is conditioned on feature representations previously generated up to time t−1 of the input video. Accordingly, the video summarization model learns intricate contextual dependencies between frames of the input video, allowing the video processing system to make an accurate summary of the input video.

Furthermore, when a transcript of the input video is available, the video summarization model can use the transcript to incorporate a language signal for the video summarization model, further increasing an accuracy of the continuous feature representations and therefore of the summary video.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 8 shows an example of a method for generating a summary video according to aspects of the present disclosure.

FIG. 9 shows an example of a method for updating parameters of a video summarization model according to aspects of the present disclosure.

DETAILED DESCRIPTION

Figure 1:
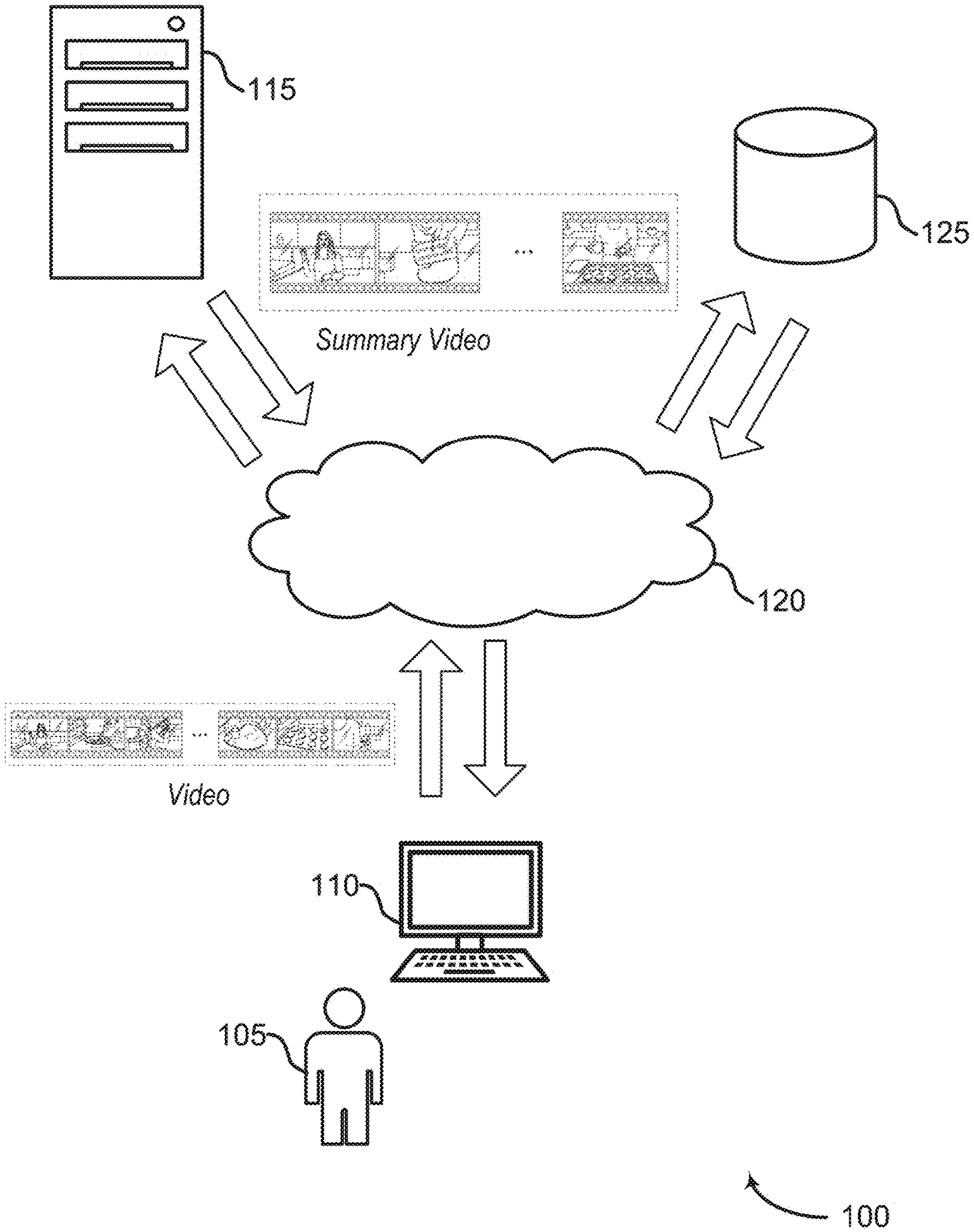
FIG. 1 shows an example of a video processing system that employs a video summarization method according to aspects of the present disclosure.

Machine learning algorithms build a model based on sample data, known as training data, to make a prediction or a decision in response to an input without being explicitly programmed to do so. For example, a machine learning model may summarize a video by selecting summary moments from the video that the machine learning model predicts to be representative of the meaning of the video as a whole. This task is highly practical as it allows a user to selectively filter content they wish to explore in greater detail or to obtain concise summaries of content that the user intends to consume.

However, the effectiveness of conventional video summarization systems is constrained both by a relatively small amount of existing training data and by an approach taken for the video summarization task. For example, conventional video processing systems use a binary classifier model to classify each frame of a video as being either a summary moment or a non-summary moment. Such binary classifier models are trained using relatively small datasets, resulting in a tendency to overfit to available training examples. Accordingly, the binary classifier models lack an ability to make accurate predictions for videos that do not fit the training data for the models.

Furthermore, such binary classifier models make a prediction of whether a video frame of a sequence of video frames is a summary moment or a non-summary moment independently of how previous video frames of the sequence of video frames have been classified, potentially leading to numerous repetitive video frames being categorized as summary moments.

By contrast, a video processing system according to aspects of the present disclosure generates a summary video including one or more portions of an input video based on generated continuous feature representations of summary moments of the input video, where a generation of a feature representation of a frame at a given time step t of the input video is conditioned on feature representations previously generated up to time t−1 of the input video. Generating the summary video based on the continuous feature representations is more accurate and efficient than a conventional process of classifying each frame of the input video as a summary moment or a non-summary moment.

Furthermore, in some embodiments, the video summarization model generates the continuous feature representations based on a transcript of the input video, thereby incorporating a language signal that further increases the accuracy of the continuous feature representations, and, in turn, the accuracy of the summary video.

An embodiment of the present disclosure can be used in a context of summarizing a transcribed video. In one example, a user provides a video and a transcript of the video to the video processing system. The video processing system uses a video encoder to generate feature representations of frames of the video and a text encoder to generate feature representations of corresponding sentences from the transcript. A summary decoder of the video processing system predicts feature representations that correspond to important summary moments of the video based on a combination of the video representations and the transcript representations. Finally, a video summary generation component generates a summary video by matching the predicted representations of the summary moments to clips from the video, and placing the selected clips in time order. The video processing system then displays the summary video to the user.

Figure 2:
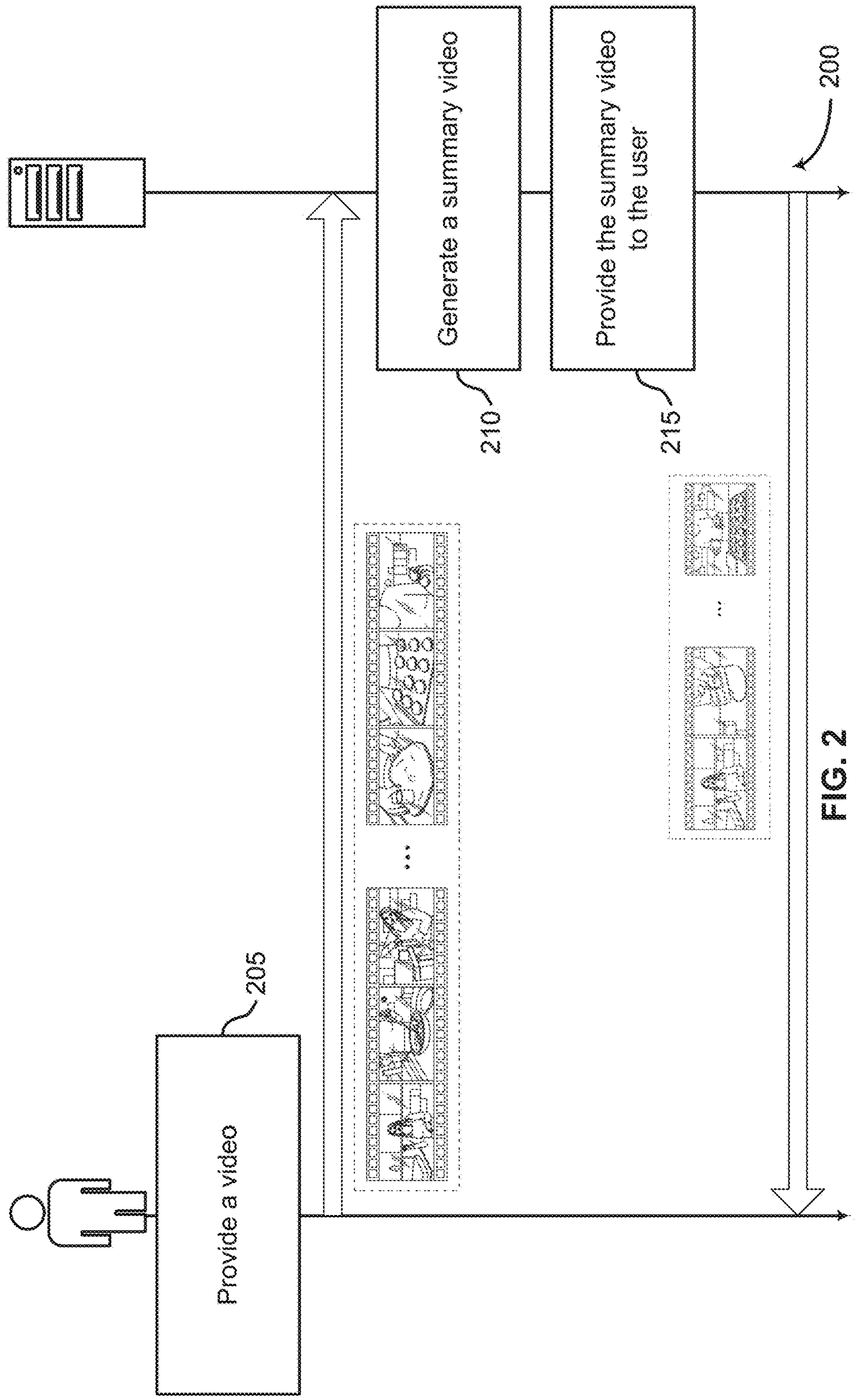
FIG. 2 shows an example of a method for summarizing a video according to aspects of the present disclosure.

Further example applications of the present disclosure in a video summarization context are provided with reference to FIG. 2. Details regarding the architecture of the video processing system are provided with reference to FIGS. 1-7. Details regarding a process for generating a summary video are described with reference to FIG. 8. Details regarding a process for training the video summarization model are described with reference to FIG. 9.

Video Processing System

An apparatus for video processing is described with reference to FIGS. 1-7.

FIG. 1 shows an example of a video processing system 100 according to aspects of the present disclosure. The example shown includes video processing system 100, user 105, user device 110, video processing apparatus 115, cloud 120, and database 125.

In the example of FIG. 1, user 105 provides a video to video processing apparatus 115 via a user interface displayed by video processing apparatus on user device 110. Video processing apparatus 115 generates a summary video based on the video (e.g., a video including one or more representative portions of the video). Video processing apparatus 115 provides the summary video to user 105 via the user interface.

According to some aspects, user device 110 is a personal computer, laptop computer, mainframe computer, palmtop computer, personal assistant, mobile device, or any other suitable processing apparatus. User device 110 includes software that displays a user interface (e.g., a graphical user interface, a text-based user interface, or a combination thereof) provided by video processing apparatus 115. The user interface allows information to be communicated between user 105 and video processing apparatus 115.

According to some aspects, a user device user interface enables user 105 to interact with user device 110. The user device user interface may include one or more of an audio device, such as an external speaker system, an external display device such as a display screen, and an input device (e.g., a remote-control device interfaced with the user interface directly or through an I/O controller module). In some cases, the user device user interface is a graphical user interface, a text-based user interface, or a combination thereof.

Video processing apparatus 115 is an example of, or includes aspects of, the corresponding element described with reference to FIGS. 3 and 5-7. According to some aspects, video processing apparatus 115 includes a computer-implemented network. The computer-implemented network includes a machine learning model (such as the video summarization model described with reference to FIGS. 3 and 5-6). Video processing apparatus 115 also includes at least one processor, a memory subsystem, a communication interface, an I/O interface, at least one user interface component, and a bus. Additionally, video processing apparatus 115 communicates with user device 110 and database 125 via cloud 120.

Video processing apparatus 115 may be implemented on a server. A server provides at least one function to users linked by way of one or more of various networks, such as cloud 120. The server may include a microprocessor board that includes a microprocessor responsible for controlling all aspects of the server. The server can use the microprocessor and protocols such as hypertext transfer protocol (HTTP), simple mail transfer protocol (SMTP), file transfer protocol (FTP), simple network management protocol (SNMP), and the like to exchange data with other devices or users on one or more of the networks. The server can be configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Further detail regarding the architecture of video processing apparatus 115 is provided with reference to FIGS. 2-7. Further detail regarding a process for generating a summary video is provided with reference to FIG. 8. Further detail regarding a process for training a video summarization model is provided with reference to FIG. 9.

Cloud 120 is a computer network configured to provide on-demand availability of computer system resources, such as data storage and computing power. Cloud 120 can provide resources without active management by a user. The term "cloud" is sometimes used to describe data centers available to many users over the Internet.

Some large cloud networks have functions distributed over multiple locations from central servers. A server is designated an edge server if it has a direct or close connection to a user. Cloud 120 may be limited to a single organization, or may be available to many organizations.

In one example, cloud 120 includes a multi-layer communications network comprising multiple edge routers and core routers. In another example, cloud 120 is based on a local collection of switches in a single physical location. Cloud 120 is operable to provide communications between user device 110, video processing apparatus 115, and database 125.

Database 125 is an organized collection of data. In an example, database 125 stores data in a specified format known as a schema. According to some aspects, database 125 is structured as a single database, a distributed database, multiple distributed databases, or an emergency backup database. A database controller may manage data storage and processing in database 125. A user may interact with the database controller, or the database controller may operate automatically without interaction from the user. Database 125 is external to video processing apparatus 115 and communicates with video processing apparatus 115 via cloud 120. Additionally or alternatively, database 125 is included in video processing apparatus 115.

FIG. 2 shows an example of a method 200 for video summarization according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 2, according to some aspects, a video processing apparatus (such as the video processing apparatus described with reference to FIGS. 1, 3, and 5-7) generates a summary video based on a video provided by a user (such as the user described with reference to FIG. 1). In some cases, the summary video includes one or more portions of the video that the video processing apparatus determines to be representative of the meaning of the video as whole.

At operation 205, a user provides a video. In some cases, the operations of this step refer to, or may be performed by, a user as described with reference to FIG. 1. In an example, the user uploads the video to the video processing apparatus, or provides a hyperlink to the video to the video processing apparatus, via a user interface (such as the user interface described with reference to FIG. 3) displayed on a user device (such as the user device described with reference to FIG. 1) by the video processing apparatus.

At operation 210, the system generates a summary video. In some cases, the operations of this step refer to, or may be performed by, a video processing apparatus as described with reference to FIGS. 1, 3, and 5-7. For example, the video processing apparatus may generate the summary video based on the video as described with reference to FIG. 8.

At operation 215, the system provides the summary video to the user. In some cases, the operations of this step refer to, or may be performed by, a video processing apparatus as described with reference to FIGS. 1, 3, and 5-7. For example, the video processing apparatus may display the summary video, or a hyperlink to the summary video, to the user via the user interface. In some embodiments, the user downloads the summary video (e.g., to the user device) via the user interface.

Figure 3:
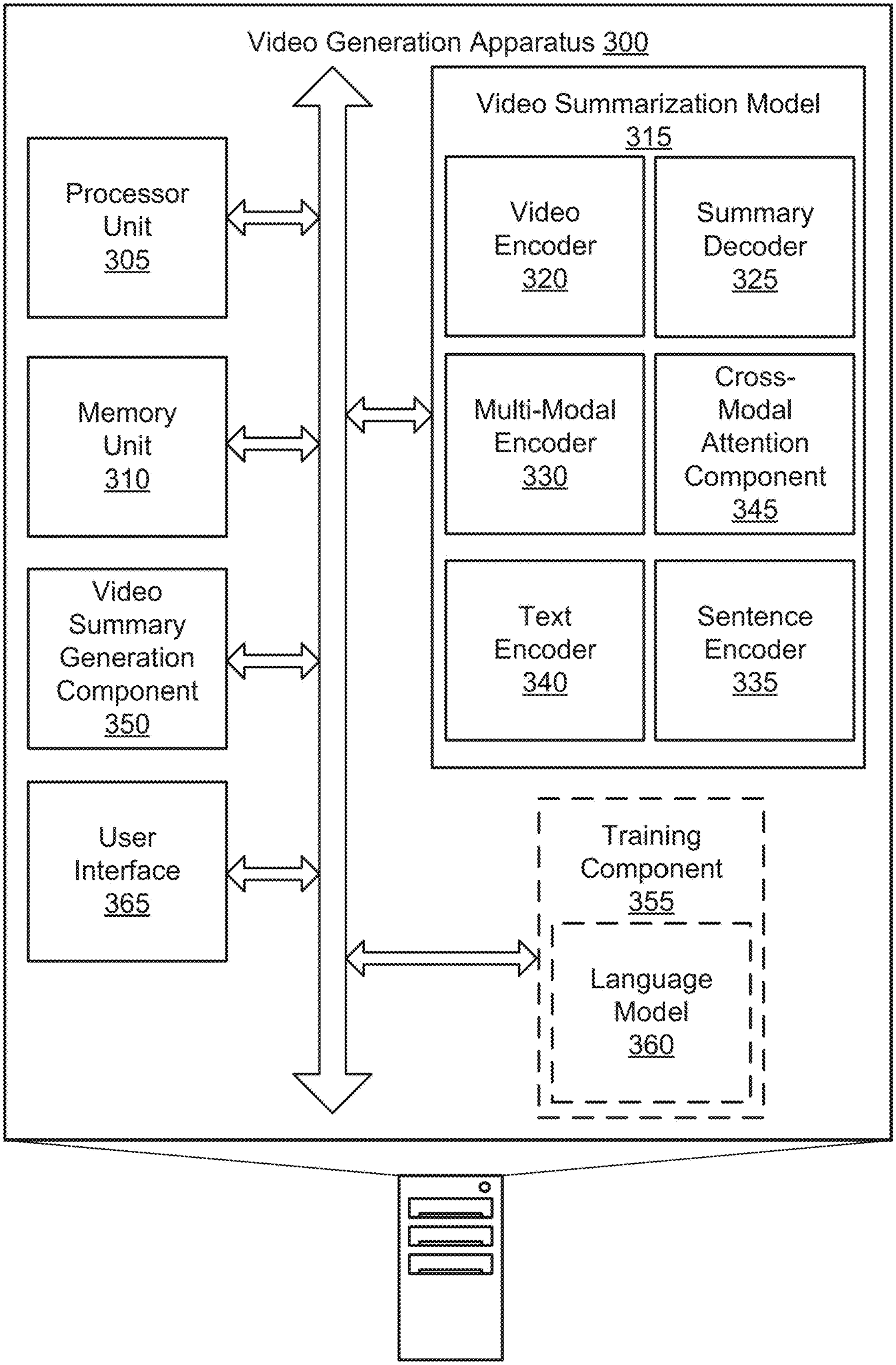
FIG. 3 shows an example of a video processing apparatus that employs a video summarization method according to aspects of the present disclosure.

FIG. 3 shows an example of a video processing apparatus 300 according to aspects of the present disclosure. Video processing apparatus 300 is an example of, or includes aspects of, the corresponding element described with reference to FIGS. 1 and 5-7. In one aspect, video processing apparatus 300 includes processor unit 305, memory unit 310, video summarization model 315, video summary generation component 350, training component 355, and user interface 365.

Processor unit 305 includes at least one processor. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some examples, processor unit 305 is configured to operate a memory array using a memory controller. In other examples, a memory controller is integrated into processor unit 305. Processor unit 305 is configured to execute computer-readable instructions stored in memory unit 310 to perform various functions. In some embodiments, processor unit 305 includes special purpose components for modem processing, baseband processing, digital signal processing, or transmission processing.

Memory unit 310 includes at least one memory device. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 305 to perform various functions described herein.

Memory unit 310 may include a basic input/output system (BIOS) that controls basic hardware or software operations, such as an interaction with peripheral components or devices. In some embodiments, memory unit 310 includes a memory controller that operates memory cells of memory unit 310. In an example, the memory controller includes a row decoder, column decoder, or both. In some embodiments, memory cells within memory unit 310 store information in the form of a logical state.

Video summarization model 315 is an example of, or includes aspects of, the corresponding element described with reference to FIGS. 5-6. According to some aspects, video summarization model 315 is implemented as software stored in memory unit 310 and executable by processor unit 305, as firmware, as at least one hardware circuit, or as a combination thereof. According to some aspects, video summarization model 315 comprises machine learning parameters stored in memory unit 310.

Machine learning parameters, also known as model parameters or weights, are variables that provide a behavior and characteristics of a machine learning model. In some cases, machine learning parameters are learned or estimated from training data and are used to make predictions or perform tasks based on learned patterns and relationships in the data.

Machine learning parameters are adjusted during a training process to minimize a loss function or maximize a performance metric. A goal of the training process is to find optimal values for the parameters that allow the machine learning model to make accurate predictions or perform well on the given task.

For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning parameters are used to make predictions on new, unseen data.

Artificial neural networks (ANNs) have numerous parameters, including weights and biases associated with each neuron in the network, which control a degree of connections between neurons and influence the ANN's ability to capture complex patterns in data.

An ANN is a hardware component or a software component that includes a number of connected nodes (i.e., artificial neurons) that loosely correspond to the neurons in a human brain. Each connection, or edge, transmits a signal from one node to another (like the physical synapses in a brain). When a node receives a signal, the node processes the signal and then transmits the processed signal to other connected nodes.

The signals between nodes may comprise real numbers, and the output of each node is computed by a function of the sum of the inputs of each node. Nodes may determine the output using other mathematical algorithms, such as selecting the max from the inputs as the output, or any other suitable algorithm for activating the node. Each node and edge may be associated with at least one node weight that determines how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

During a training process of an ANN, the node weights are adjusted to increase the accuracy of the result (e.g., by minimizing a loss which corresponds in some way to the difference between the current result and the target result). The weight of an edge increases or decreases the strength of the signal transmitted between nodes. Nodes may have a threshold below which a signal is not transmitted at all. The nodes may be aggregated into layers. Different layers perform different transformations on their inputs. The initial layer is known as the input layer and the last layer is known as the output layer. Signals may traverse certain layers multiple times.

According to some aspects, video summarization model 315 obtains a video. In some examples, video summarization model 315 obtains a transcript of the video. According to some aspects, video summarization model 315 is trained to generate a sequence of contextualized visual representations corresponding to portions of a video and to generate a sequence of summary visual representations corresponding to a subset of the portions of the video based on the sequence of contextualized visual representations. In some aspects, the video summarization model 315 is trained using training data including a training video and a text summary of the training video.

In one aspect, video summarization model 315 includes video encoder 320, summary decoder 325, multi-modal encoder 330, sentence encoder 335, text encoder 340, and cross-modal attention component 345.

Video encoder 320 is an example of, or includes aspects of, the corresponding element described with reference to FIGS. 5-6. According to some aspects, video encoder 320 is trained to generate a sequence of contextualized visual representations. According to some aspects, video encoder 320 generates the sequence of contextualized visual representations corresponding to portions of the video. According to some aspects, video encoder 320 generates a sequence of contextualized visual representations corresponding to portions of the training video.

Summary decoder 325 is an example of, or includes aspects of, the corresponding element described with reference to FIGS. 5-6. According to some aspects, summary decoder 325 is trained to generate a sequence of summary visual representations corresponding to a subset of the portions of the video based on the sequence of contextualized visual representations. According to some aspects, summary decoder 325 generates a sequence of summary visual representations corresponding to a subset of the portions of the training video based on the sequence of contextualized visual representations.

According to some aspects, video encoder 320 comprises a stack of one or more encoder layers of a transformer (such as the transformer described with reference to FIG. 4) and summary decoder 325 comprises a series of one or more decoder layers of the transformer. A transformer comprises one or more ANNs comprising attention mechanisms that enable the transformer to weigh an importance of different words or tokens within a sequence. A transformer processes entire sequences simultaneously in parallel, making the transformer highly efficient and allowing the transformer to capture long-range dependencies more effectively.

According to some aspects, a transformer comprises an encoder-decoder structure. The encoder of the transformer processes an input sequence and encodes the input sequence into a set of high-dimensional representations, and the decoder generates an output sequence based on the encoded representations and previously generated tokens. The encoder and the decoder may be composed of multiple layers of self-attention mechanisms and feed-forward ANNs.

The self-attention mechanism allows the transformer to focus on different parts of an input sequence while computing representations for the input sequence. The self-attention mechanism captures relationships between words of a sequence by assigning attention weights to each word based on a relevance to other words in the sequence, thereby enabling the transformer to model dependencies regardless of a distance between words.

An attention mechanism is a key component in some ANN architectures, particularly ANNs employed in natural language processing (NLP) and sequence-to-sequence tasks, which allows an ANN to focus on different parts of an input sequence when making predictions or generating output.

NLP refers to techniques for using computers to interpret or generate natural language. NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. In some cases, these models express the relative probability of multiple answers.

Some sequence models (such as recurrent neural networks) process an input sequence sequentially, maintaining an internal hidden state that captures information from previous steps. However, this sequential processing may lead to difficulties in capturing long-range dependencies or attending to specific parts of the input sequence.

The attention mechanism addresses these difficulties by enabling an ANN to selectively focus on different parts of an input sequence, assigning varying degrees of importance or attention to each part. The attention mechanism achieves the selective focus by considering a relevance of each input element with respect to a current state of the ANN.

An ANN employing an attention mechanism may receive an input sequence and maintains the current state, which represents an understanding or context. For each element in the input sequence, the attention mechanism computes an attention score that indicates the importance or relevance of that element given the current state. The attention scores are transformed into attention weights through a normalization process, such as applying a softmax function. The attention weights represent the contribution of each input element to the overall attention. The attention weights are used to compute a weighted sum of the input elements, resulting in a context vector. The context vector represents the attended information or the part of the input sequence that the ANN considers most relevant for the current step. The context vector is combined with the current state of the ANN, providing additional information and influencing subsequent predictions or decisions of the ANN.

By incorporating an attention mechanism, an ANN dynamically allocates attention to different parts of the input sequence, allowing the ANN to focus on relevant information and capture dependencies across longer distances.

Calculating attention may involve three basic steps. First, a similarity between a query vector Q and a key vector K obtained from the input is computed to generate attention weights. Similarity functions used for this process include dot product, splice, detector, and the like. Next, a softmax function is used to normalize the attention weights. Finally, the attention weights are weighed together with their corresponding values V. In the context of an attention network, the key K and value V are vectors or matrices that are used to represent the input data. The key K is used to determine which parts of the input the attention mechanism should focus on, while the value V is used to represent the actual data being processed. An example of a transformer is described in further detail with reference to FIG. 4.

Multi-modal encoder 330 is an example of, or includes aspects of, the corresponding element described with reference to FIGS. 5-7. According to some aspects, multi-modal encoder 330 is omitted from video summarization model 315 and included in video processing apparatus 300. According to some aspects, multi-modal encoder 330 is implemented as software stored in memory unit 310 and executable by processor unit 305, as firmware, as at least one hardware circuit, or as a combination thereof. According to some aspects, multi-modal encoder 330 comprises machine learning parameters stored in memory unit 310.

According to some aspects, multi-modal encoder 330 is trained to generate a sequence of preliminary visual representations based on the video. In some examples, the sequence of contextualized visual representations is generated based on the sequence of preliminary visual representations. According to some aspects, multi-modal encoder 330 generates a sequence of preliminary visual representations based on the training video, where the portions of the text summary are matched to the portions of the training video based on the sequence of preliminary visual representations. In some examples, multi-modal encoder 330 generates a sequence of preliminary visual representations based on the training video, where the sequence of contextualized visual representations is generated based on the sequence of preliminary visual representations. In some examples, multi-modal encoder 330 generates a sequence of target visual representations of the target summary video.

According to some aspects, multi-modal encoder 330 is trained to generate an output embedding in a multi-modal embedding space based on a text input, an image input, or a combination thereof. In some cases, the text input and the image input may then be compared with each other, and a similarity between the text input and the image input may be determined, based on a similarity between their respective output embeddings in the multi-modal embedding space. In some examples, multi-modal encoder 330 is trained to associate images with corresponding textual descriptions, and therefore is able to accurately predict an image associated with a text input, and vice-versa. In some embodiments, multi-modal encoder 330 is implemented as a Contrastive Language-Image Pre-training (CLIP) model.

Sentence encoder 335 is an example of, or includes aspects of, the corresponding element described with reference to FIGS. 5-6. According to some aspects, sentence encoder 335 is omitted from video summarization model 315 and included in video processing apparatus 300. According to some aspects, sentence encoder 335 is implemented as software stored in memory unit 310 and executable by processor unit 305, as firmware, as at least one hardware circuit, or as a combination thereof. According to some aspects, sentence encoder 335 comprises machine learning parameters stored in memory unit 310.

According to some aspects, sentence encoder 335 is trained to generate a sequence of preliminary text features based on a text input, such as the transcript. In some embodiments, sentence encoder 335 comprises a transformer (such as the transformer described with reference to FIG. 4). In some embodiments, sentence encoder 335 comprises a Bidirectional Encoder Representations from Transformers (BERT) model.

A BERT model uses a bidirectional approach to pretraining. For example, instead of processing an input sequence of words sequentially, BERT considers an entire context of a word in the sequence by processing the word from both the beginning of the sequence and the end of the sequence. This bidirectional understanding allows BERT to capture a deeper semantic meaning and context of the input sequence.

In some embodiments, sentence encoder 335 comprises a Robustly optimized BERT approach (ROBERTa) model. A ROBERTa model builds upon the architecture of BERT while removing a next sentence prediction (NSP) task during pre-training and instead focuses on masking contiguous spans of text, allowing the ROBERTA model to better capture long-range dependencies in language. ROBERTa can employ larger batch sizes and longer training sequences than BERT, resulting in more robust and generalized representations of text.

In some embodiments, sentence encoder 335 comprises a Sentence-ROBERTa (SROBERTa) model. An SRoBERTa model comprises a modification of the ROBERTa model, wherein the SROBERTa model comprises Siamese and triplet network structures used to derive semantically meaningful sentence embeddings of input sentences that can be compared using cosine similarity. A context size of the SROBERTa model may be greater than a context size of a large language model, thereby allowing the SROBERTa model to accurately process a transcript that includes a large number of tokens.

Text encoder 340 is an example of, or includes aspects of, the corresponding element described with reference to FIGS. 5-6. According to some aspects, text encoder 340 is trained to generate a sequence of text features based on the transcript. In some aspects, text encoder 340 trained generates the sequence of text features based on the sequence of preliminary text features. According to some aspects, text encoder 340 comprises a stack of one or more encoders of transformer (such as the transformer described with reference to FIG. 4).

Cross-modal attention component 345 is an example of, or includes aspects of, the corresponding element described with reference to FIGS. 5-6. According to some aspects, cross-modal attention component 345 comprises one or more multi-head self-attention sublayers of a transformer (such as the transformer described with reference to FIG. 4).

According to some aspects, cross-modal attention component 345 is trained to generate a sequence of text-conditioned visual features based on the sequence of text features and a sequence of contextualized visual representations. In some examples, the sequence of summary visual representations is generated based on the sequence of text-conditioned visual features.

According to some aspects, cross-modal attention component 345 generates a sequence of text-conditioned visual features based on the transcript and the sequence of contextualized visual representations, where the sequence of summary visual representations is generated based on the sequence of text-conditioned visual features.

Video summary generation component 350 is an example of, or includes aspects of, the corresponding element described with reference to FIG. 5. According to some aspects, video summary generation component 350 is implemented as software stored in memory unit 310 and executable by processor unit 305, as firmware, as at least one hardware circuit, or as a combination thereof.

According to some aspects, video summary generation component 350 generates a summary video including the subset of the portions of the video based on the sequence of summary visual representations. In some examples, video summary generation component 350 matches each of the sequence of summary visual representations to a corresponding portion of the subset of the portions of the video.

Training component 355 is an example of, or includes aspects of, the corresponding element described with reference to FIGS. 6-7. According to some aspects, training component 355 is implemented as software stored in memory unit 310 and executable by processor unit 305, as firmware, as at least one hardware circuit, or as a combination thereof. According to some aspects, training component 355 is omitted from video processing apparatus 300. According to some aspects, training component 355 is included in a separate apparatus and communicates with video processing apparatus 300 to perform the functions described herein. According to some aspects, training component 355 is implemented as software stored in a memory unit of the separate apparatus and executable by a processor unit of the separate apparatus, as firmware of the separate apparatus, as at least one hardware circuit of the separate apparatus, or as a combination thereof.

According to some aspects, training component 355 obtains a training set including a training video and a target summary video. In some examples, training component 355 updates parameters of video summarization model 315 based on the sequence of summary visual representations and the sequence of target visual representations.

In some examples, training component 355 obtains a text summary of the training video. In some examples, training component 355 generates the target summary video based on the text summary. In some examples, training component 355 obtains a transcript of the training video. In some examples, training component 355 matches portions of the text summary to portions of the training video. In some examples, training component 355 includes the matched portions of the training video in the target summary video.

In some examples, training component 355 computes a feature reconstruction loss based on a comparison of the sequence of summary visual representations and the sequence of target visual representations. In some cases, training component 355 updates the parameters of summary decoder 325 based on the feature reconstruction loss.

In some embodiments, training component 355 includes language model 360. Language model 360 is an example of, or includes aspects of, the corresponding element described with reference to FIG. 7. According to some aspects, language model 360 comprises text generation parameters (e.g., machine learning parameters) stored in memory unit 310 or in the memory unit of the separate apparatus. According to some aspects, language model 360 generates the text summary based on the transcript.

According to some aspects, language model 360 comprises a large language model. A large language model is trained to understand and generate human-like text based on large amounts of data. By analyzing input text data, a large language model learns patterns and structures of human language. In some embodiments, language model 360 includes one or more transformers (such as the transformer described with reference to FIG. 4).

According to some aspects, user interface 365 is implemented as software stored in memory unit 310 and executable by processor unit 305. According to some aspects, user interface 365 comprises a graphical user interface, a text-based user interface, or a combination thereof. According to some aspects, user interface 365 is configured to obtain the video, the transcript, the text summary, the target summary video, or a combination thereof. According to some aspects, user interface 365 is configured to provide the text summary, the target summary video, the summary video, or a combination thereof.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 4:
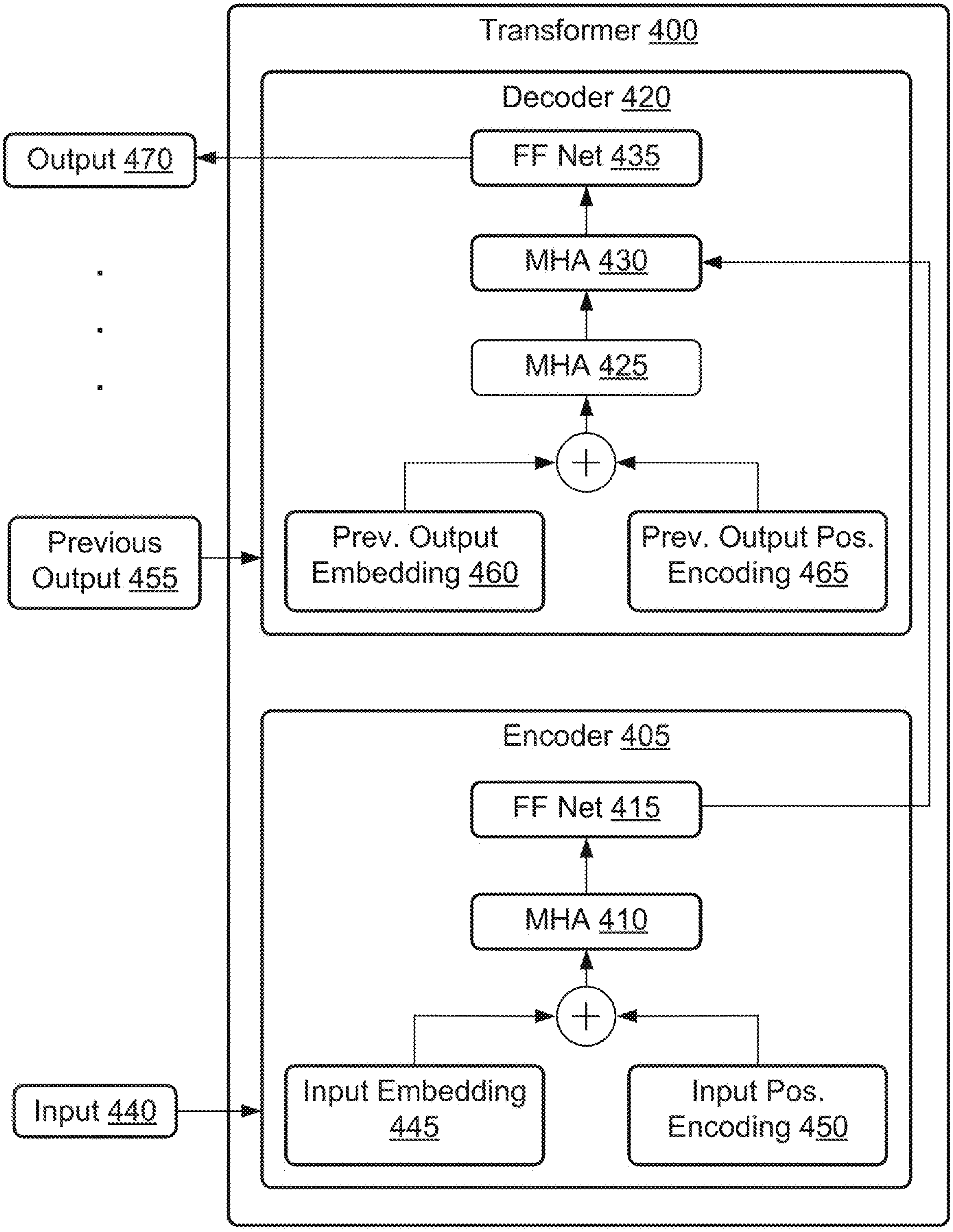
FIG. 4 shows an example of a transformer according to aspects of the present disclosure.

FIG. 4 shows an example of a transformer according to aspects of the present disclosure. The example shown includes transformer 400, encoder 405, decoder 420, input 440, input embedding 445, input positional encoding 450, previous output 455, previous output embedding 460, previous output positional encoding 465, and output 470.

In the example of FIG. 4, encoder 405 includes multi-head self-attention sublayer 410 and feed-forward network sublayer 415. Decoder 420 includes first multi-head self-attention sublayer 425, second multi-head self-attention sublayer 430, and feed-forward network sublayer 435.

Encoder 405 is configured to map input 440 to a sequence of continuous representations that are fed into decoder 420. Decoder 420 generates output 470 (e.g., a prediction of an output sequence of words or tokens) based on the output of encoder 405 and previous output 455 (e.g., a previously predicted output sequence), which allows for the use of autoregression.

Encoder 405 parses input 440 into tokens and vectorizes the parsed tokens to obtain input embedding 445, and adds input positional encoding 450 (e.g., positional encoding vectors for input 440 of a same dimension as input embedding 445) to input embedding 445. Input positional encoding 450 includes information about relative positions of words or tokens in input 440.

Encoder 405 comprises one or more encoding layers (e.g., six encoding layers) that generate contextualized token representations, where each representation corresponds to a token that combines information from other input tokens via self-attention mechanism. Each encoding layer of encoder 405 comprises a multi-head self-attention sublayer (e.g., multi-head self-attention sublayer 410). The multi-head self-attention sublayer implements a multi-head self-attention mechanism that receives different linearly projected versions of queries, keys, and values to produce outputs in parallel. Each encoding layer of encoder 405 also includes a fully connected feed-forward network sublayer (e.g., feed-forward network sublayer 415) comprising two linear transformations surrounding a Rectified Linear Unit (ReLU) activation:

$$FFN(x) = \mathrm{Re}LU(W_1 x + b_1)W_2 + b_2 \tag{1}$$

Each layer employs different weight parameters ($W_1$, $W_2$) and different bias parameters ($b_1$, $b_2$) to apply a same linear transformation to each word or token in input 440.

Each sublayer of encoder 405 is followed by a normalization layer that normalizes a sum computed between a sublayer input x and an output sublayer (x) generated by the sublayer:

$$\mathrm{layernorm}(x + \mathrm{sublayer}(x)) \tag{2}$$

Encoder 405 is bidirectional because encoder 405 attends to each word or token in input 440 regardless of a position of the word or token in input 440.

Decoder 420 comprises one or more decoding layers (e.g., six decoding layers). Each decoding layer comprises three sublayers including a first multi-head self-attention sublayer (e.g., first multi-head self-attention sublayer 425), a second multi-head self-attention sublayer (e.g., second multi-head self-attention sublayer 430), and a feed-forward network sublayer (e.g., feed-forward network sublayer 435). Each sublayer of decoder 420 is followed by a normalization layer that normalizes a sum computed between a sublayer input x and an output sublayer (x) generated by the sublayer.

Decoder 420 generates previous output embedding 460 of previous output 455 and adds previous output positional encoding 465 (e.g., position information for words or tokens in previous output 455) to previous output embedding 460. Each first multi-head self-attention sublayer receives the combination of previous output embedding 460 and previous output positional encoding 465 and applies a multi-head self-attention mechanism to the combination. For each word in an input sequence, each first multi-head self-attention sublayer of decoder 420 attends only to words preceding the word in the sequence, and so a prediction of transformer 400 for a word at a particular position only depends on known outputs for a word that came before the word in the sequence. For example, each first multi-head self-attention sublayer implements multiple single-attention functions in parallel by introducing a mask over values produced by the scaled multiplication of matrices Q and K by suppressing matrix values that would otherwise correspond to disallowed connections.

Each second multi-head self-attention sublayer implements a multi-head self-attention mechanism similar to the multi-head self-attention mechanism implemented in each multi-head self-attention sublayer of encoder 405 by receiving a query Q from a previous sublayer of decoder 420 and a key K and a value V from the output of encoder 405, allowing decoder 420 to attend to each word in the input 440.

Each feed-forward network sublayer implements a fully connected feed-forward network similar to feed-forward network sublayer 415. The feed-forward network sublayers are followed by a linear transformation and a softmax to generate a prediction of output 470 (e.g., a prediction of a next word or token in a sequence of words or tokens). Accordingly, in some cases, transformer 400 can generate a response as described herein based on a predicted sequence of words or tokens.

Figure 5:
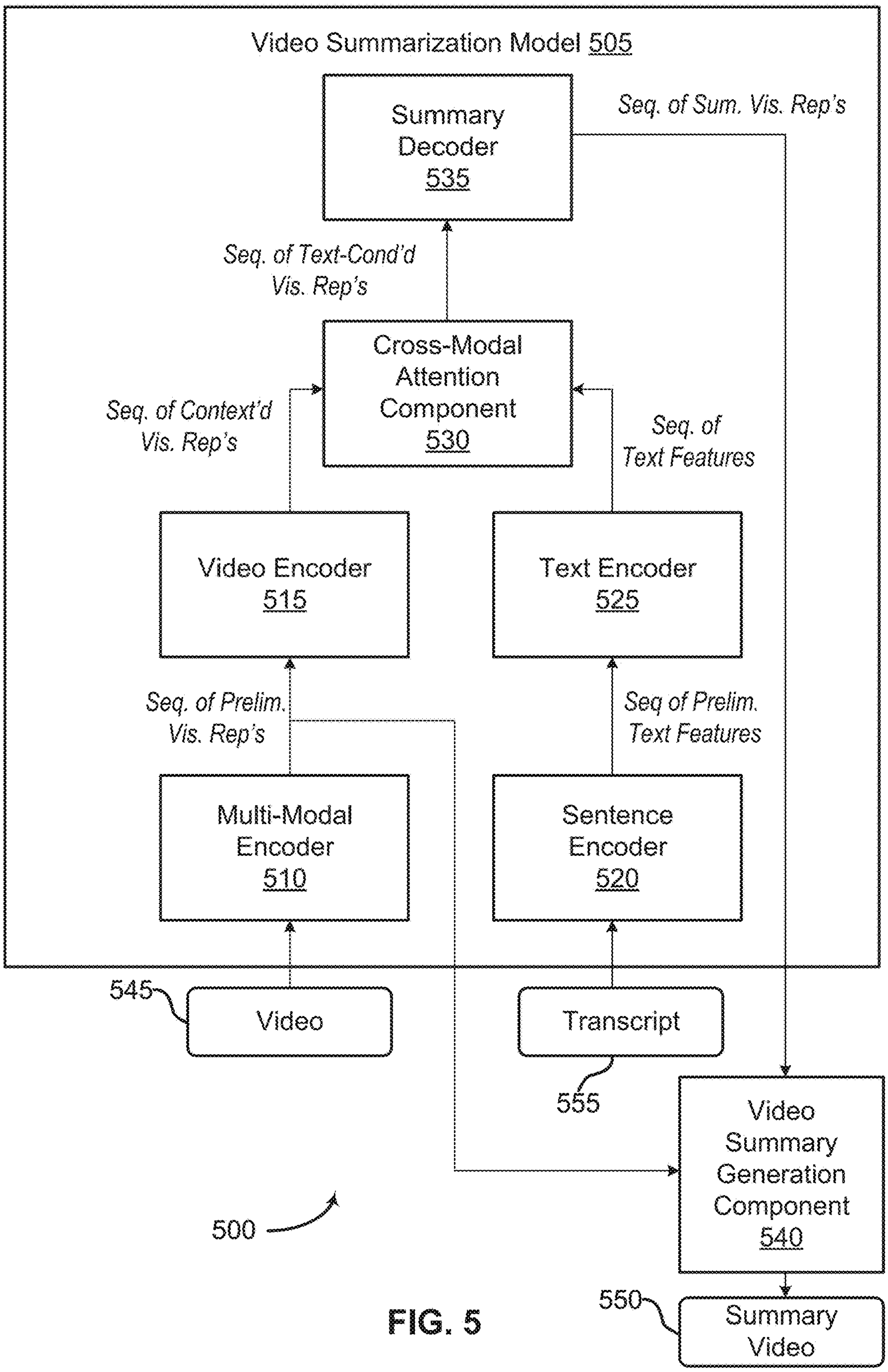
FIG. 5 shows an example of data flow in a video processing apparatus according to aspects of the present disclosure.

FIG. 5 shows an example of data flow in a video processing apparatus 500 according to aspects of the present disclosure. The example shown includes video processing apparatus 500, video 545, summary video 550, and transcript 555. Video processing apparatus 500 is an example of, or includes aspects of, the corresponding element described with reference to FIGS. 1, 3, and 6-7.

In one aspect, video processing apparatus 500 includes video summarization model 505 and video summary generation component 540. Video summarization model 505 is an example of, or includes aspects of, the corresponding element described with reference to FIGS. 3 and 6. In one aspect, video summarization model 505 includes multi-modal encoder 510, video encoder 515, sentence encoder 520, text encoder 525, cross-modal attention component 530, and summary decoder 535.

Multi-modal encoder 510, video encoder 515, sentence encoder 520, text encoder 525, cross-modal attention component 530, and summary decoder 535 are examples of, or include aspects of, the corresponding elements described with reference to FIGS. 2 and 6. Video summary generation component 540 is an example of, or includes aspects of, the corresponding element described with reference to FIG. 2.

In the example of FIG. 5, multi-modal encoder 510 generates a sequence of preliminary visual representations based on video 545. Video encoder 515 generates a sequence of contextualized visual representations based on the sequence of preliminary visual representations. Sentence encoder 520 generates a sequence of preliminary text features based on transcript 555. Text encoder 525 generates a sequence of text features based on the sequence of preliminary text features.

Cross-modal attention component 530 generates a sequence of text-conditioned visual representations based on the sequence of contextualized visual representations and the sequence of text features. Summary decoder 535 generates the sequence of summary visual representations based on the sequence of text-conditioned visual representations. Video summary generation component 540 generates summary video 550 based on the sequence of preliminary visual representations and the sequence of summary visual representations.

Figure 6:
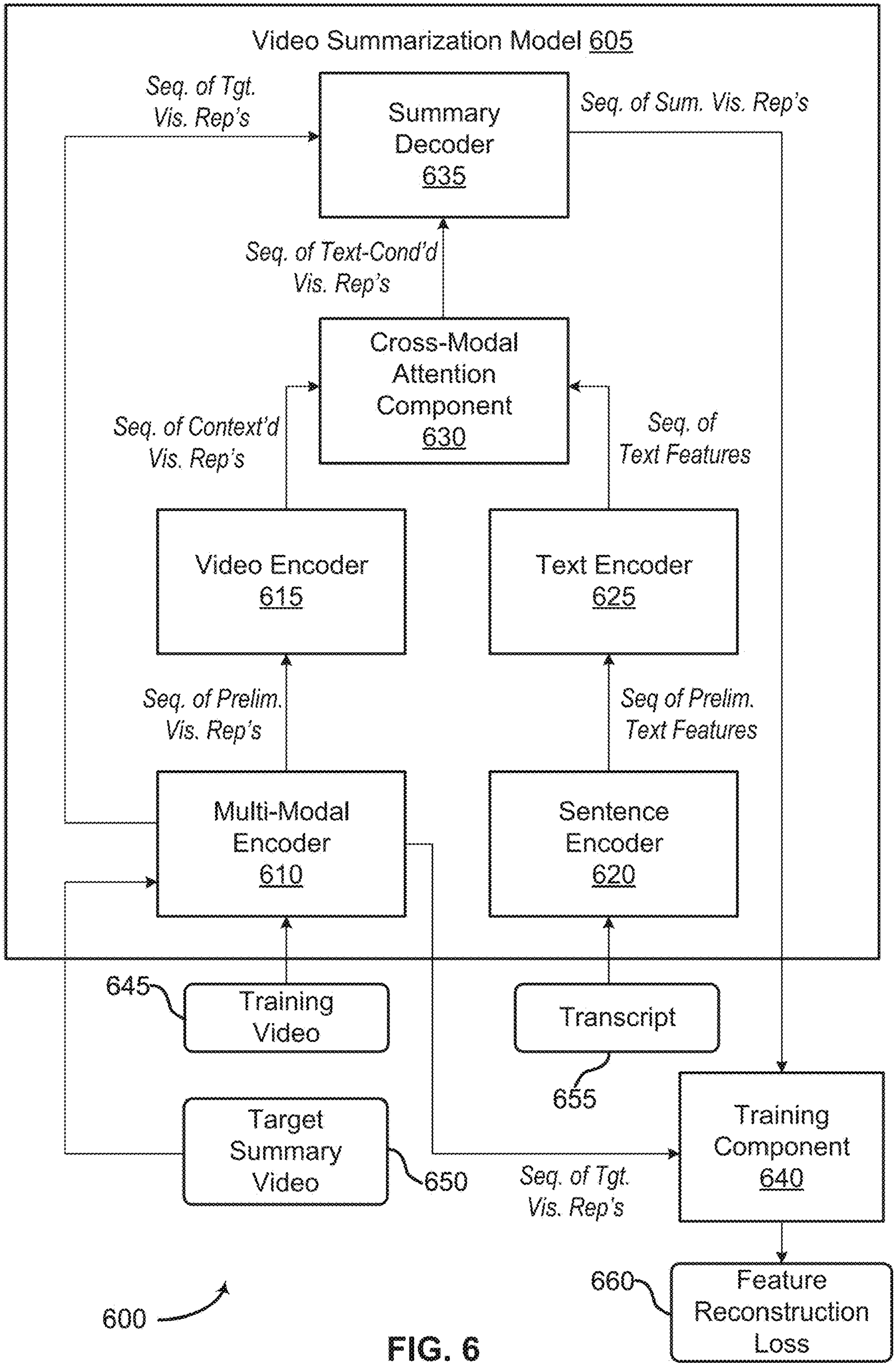
FIG. 6 shows an example of data flow for training a video processing apparatus according to aspects of the present disclosure.

FIG. 6 shows an example of data flow for training a video processing apparatus 600 according to aspects of the present disclosure. The example shown includes video processing apparatus 600, training video 645, target summary video 650, transcript 655, and feature reconstruction loss 660.

Video processing apparatus 600 is an example of, or includes aspects of, the corresponding element described with reference to FIGS. 1-2, 5, and 7. In one aspect, video processing apparatus 600 includes video summarization model 605 and training component 640. Video summarization model 605 is an example of, or includes aspects of, the corresponding element described with reference to FIGS. 2 and 5.

In one aspect, video summarization model 605 includes multi-modal encoder 610, video encoder 615, sentence encoder 620, text encoder 625, cross-modal attention component 630, and summary decoder 635.

Multi-modal encoder 610 is an example of, or includes aspects of, the corresponding element described with reference to FIGS. 2, 5, and 7. Video encoder 610, sentence encoder 620, text encoder 625, cross-modal attention component 630, and summary decoder 635 are examples of, or include aspects of, the corresponding elements described with reference to FIGS. 2 and 5.

Training component 640 is an example of, or includes aspects of, the corresponding element described with reference to FIGS. 2 and 7. Training video 645, target summary video 650, and transcript 655 are examples of, or include aspects of, the corresponding elements described with reference to FIG. 7.

In the example of FIG. 6, multi-modal encoder 610 generates a sequence of preliminary visual representations based on training video 645. Video encoder 615 generates a sequence of contextualized visual representations based on the sequence of preliminary visual representations. Sentence encoder 620 generates a sequence of preliminary text features based on transcript 655. Text encoder 625 generates a sequence of text features based on the sequence of preliminary text features. Cross-modal attention component 630 generates a sequence of text-conditioned visual representations based on the sequence of contextualized visual representations and the sequence of text features.

Multi-modal encoder 610 generates a sequence of target visual representations based on target summary video 650. Summary decoder 635 generates a sequence of summary visual representations based on the sequence of target visual representations and the sequence of text-conditioned visual representations.

Training component 640 generates feature reconstruction loss 660 based on the sequence of summary visual representations and the sequence of target visual representations. Training component 640 updates the parameters of video summarization model 605 using feature reconstruction loss 660.

Figure 7:
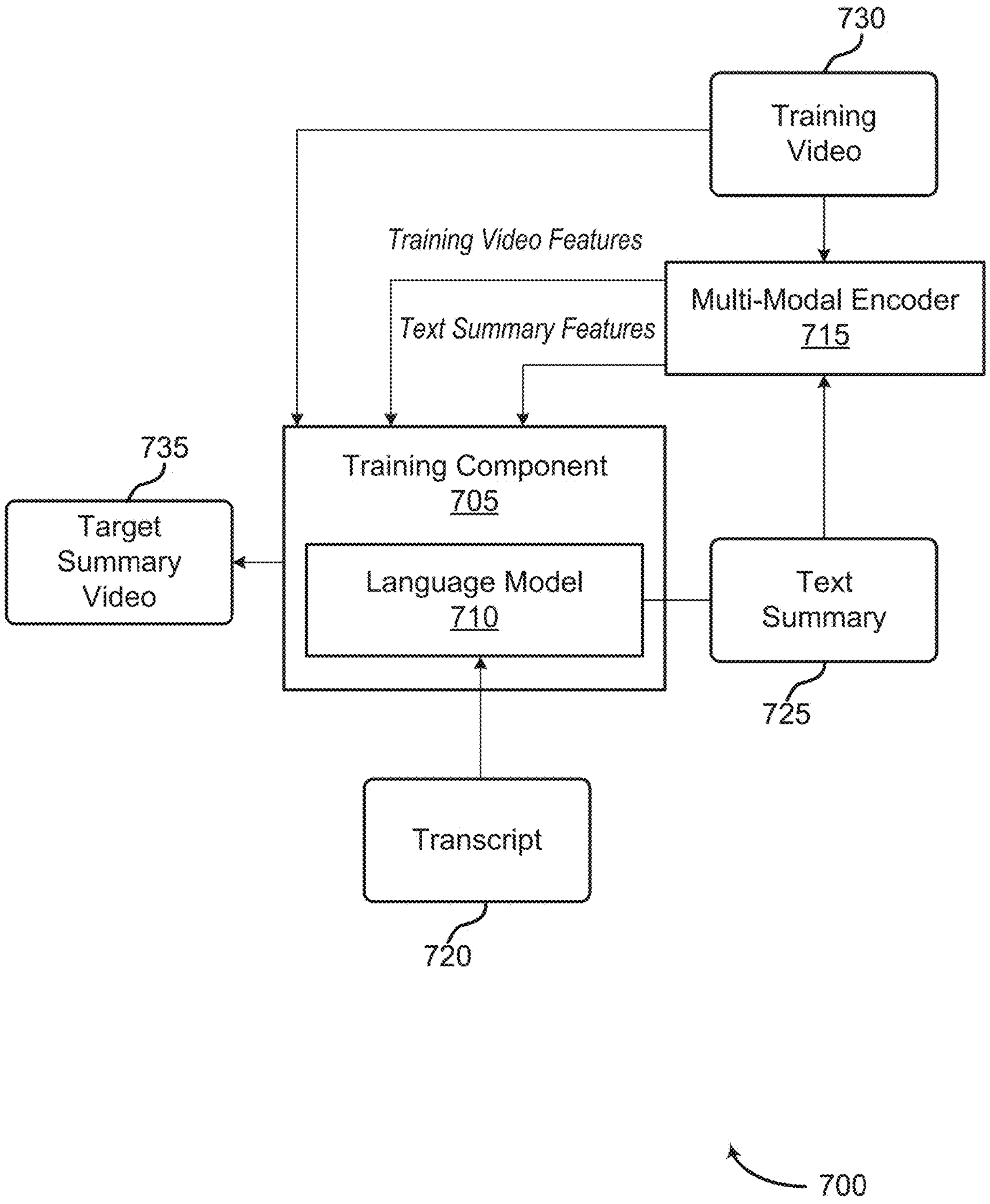
FIG. 7 shows an example of data flow for generating a target summary video according to aspects of the present disclosure.

FIG. 7 shows an example of data flow for generating a target summary video according to aspects of the present disclosure. The example shown includes video processing apparatus 700, transcript 720, text summary 725, training video 730, and target summary video 735.

Video processing apparatus 700 is an example of, or includes aspects of, the corresponding element described with reference to FIGS. 1, 3, and 5-6. In one aspect, video processing apparatus 700 includes training component 705 and multi-modal encoder 715. Training component 705 is an example of, or includes aspects of, the corresponding element described with reference to FIGS. 2 and 6. Multi-modal encoder 715 is an example of, or includes aspects of, the corresponding element described with reference to FIGS. 3 and 5-6. In one aspect, training component 705 includes language model 710. Language model 710 is an example of, or includes aspects of, the corresponding element described with reference to FIG. 2. Transcript 720, training video 730, and target summary video 735 are examples of, or include aspects of, the corresponding elements described with reference to FIG. 8.

In the example of FIG. 7, language model 710 generates text summary 725 based on transcript 720. Training component 705 generates target summary video based on text summary 725 and training video 730. Multi-modal encoder 715 generates text summary features based on text summary 725. Multi-modal encoder 715 generates training video features based on training video 730. Training component 705 generates target summary video 735 based on training text summary 725, training video 730, the text summary features, and the training video features.

Accordingly, one or more aspects of the apparatus include at least one processor; at least one memory storing instructions executable by the at least one processor; and a video summarization model comprising parameters stored in the at least one memory, wherein the video summarization model is trained to generate a sequence of contextualized visual representations corresponding to portions of a video and to generate a sequence of summary visual representations corresponding to a subset of the portions of the video based on the sequence of contextualized visual representations.

Some examples of the apparatus and system further include a video summary generation component configured to generate a summary video including the subset of the portions of the video based on the sequence of summary visual representations. Some examples of the apparatus and system further include a multi-modal encoder trained to generate a sequence of preliminary visual representations based on the video.

In some aspects, the video summarization model comprises a video encoder trained to generate the sequence of contextualized visual representations. In some aspects, the video summarization model comprises a summary decoder trained to generate a sequence of summary visual representations corresponding to a subset of the portions of the video based on the sequence of contextualized visual representations. In some aspects, the video summarization model comprises a text encoder trained to generate a sequence of text features based on the transcript. In some aspects, the video summarization model comprises a cross-modal attention component trained to generate a sequence of text-conditioned visual features based on the sequence of text features and a sequence of contextualized visual representations.

Video Processing

FIG. 8 shows an example of a method 800 for generating a summary video according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 8, according to some aspects, a video processing system uses an encoder and a decoder of a video summarization machine learning model to respectively encode a video to obtain features for the video and decode the features of the video to obtain features for a summary video, which are used to obtain the summary video.

Conventional video processing systems use a binary classifier model to classify each frame of a video as being either a summary moment or a non-summary moment. Such an approach is inaccurate both because it suffers from a long-tail distribution problem characterized by a significant class imbalance, as a number of summary moments in a video is considerably smaller compared to non-summary moments, and because the prediction of whether a video frame of a sequence of video frames is a summary moment or a non-summary moment is made independently of and without consideration for how previous video frames of the sequence of video frames have been classified, potentially leading to numerous repetitive video frames being categorized as summary moments.

By contrast, according to some aspects, the video summarization model uses a regression-based approach of decoding continuous feature representations of summary moments of a video, thereby mitigating the long-tail distribution problem. Furthermore, in some cases, the video summarization model uses an autoregressive decoding process in which decoding at a given time step t of the video is conditioned on feature representations previously decoded up to time t−1 of the video, allowing the video summarization model to learn intricate contextual dependencies between feature representations of the frames of the video and therefore increase an accuracy of the identification of the feature representations of the summary moments of the video.

Furthermore, in some cases, the video summarization model generates the feature representations of the summary video based on a transcript of the video, thereby incorporating a language signal that increases an accuracy of the identification of the feature representations.

According to some aspects, the video summarization model is implemented using a transformer-based encoder-decoder architecture that takes a relatively long video as input and autoregressively generates a relatively shorter summary video. In one example, the video summarization model approaches video summarization as a multi-modal task and integrates both visual and textual (e.g., transcribed) cues to guide a prediction of feature representations of the summary video. The feature representations of the summary video may be matched with feature representations of the input video to generate the summary video.

As used herein, a "video" refers to a time-ordered sequence of frames, or images. As used herein, a "video summary" refers to a video including one or more portions of the video. As used herein, a "summary moment" refers to a frame or a set of frames of the video to be included in the summary video. As used herein, a "transcript" refers to text including a transcription of audio (e.g., speech) included in the video. The transcript may include one or more timestamps.

As used herein, an "embedding" (such as a feature representation, a contextualized visual representation, a summary visual representation, a preliminary visual representation, a text feature, or a text-conditioned visual feature) refers to a representation of an object (e.g., a frame of a video, or a sentence of a transcript) in a lower-dimensional space such that semantic information about the object is more easily captured and analyzed by a machine learning model. An example embedding is a numerical representation of the object in a continuous vector space in which objects that include similar semantic information to each other correspond to vectors that are numerically similar to and thus "closer" to each other, thereby allowing a similarity between different objects corresponding to different embeddings to be readily determined.

According to some aspects, the continuous vector space comprises a multi-modal embedding space, in which embeddings of similar objects from different modalities (e.g., an image modality and a text modality) are close to each other, therefore allowing for meaningful cross-modal comparisons.

At operation 805, the system obtains a video. In some cases, the operations of this step refer to, or may be performed by, a video summarization model as described with reference to FIGS. 3 and 5-6. The video (VD) includes a sequence of frames uniformly sampled every t seconds, e.g., $VD=\{X_1, X_2, \ldots, X_n\}$, where $X_n$ denotes a frame (e.g., an image) at time step $t_n$.

For example, a user (such as the user described with reference to FIG. 1) may upload or link to the video using a user interface (such as the user interface described with reference to FIG. 3) displayed on a user device (such as the user device described with reference to FIG. 1) by a video processing apparatus (such as the video processing apparatus described with reference to FIGS. 1, 3, and 5-7).

In some embodiments, the user interface provides the video to the video summarization model and/or to a multi-modal encoder (such as the multi-modal encoder described with reference to FIGS. 3 and 5-7). Alternatively, the video processing apparatus retrieves the video from a database (such as the database described with reference to FIG. 1) and provides the video to the video summarization model and/or to the multi-modal encoder.

At operation 810, the system generates, using a video encoder of a video summarization model, a sequence of contextualized visual representations corresponding to portions of the video. In some cases, the operations of this step refer to, or may be performed by, a video encoder as described with reference to FIGS. 3 and 5-6.

For example, the multi-modal encoder (MME) generates a sequence of preliminary visual representations $\{x_1, x_2, \ldots, x_n\}$ based on the video VD: $\{x_1, x_2, \ldots, x_n\}=MME(\{X_1, X_2, \ldots, X_n\})$. The sequence of preliminary visual representations may include respective embeddings of each frame of the video VD in a multi-modal embedding space. In some embodiments, generating the sequence of preliminary visual representations comprises a visual tokenization of the video VD. In some embodiments, the sequence of preliminary visual representations includes a start-of-sequence (SOS) token to mark the beginning of the sequence and an end-of-sequence (EOS) token to mark the end of the sequence.

The video encoder (VE) receives the sequence of preliminary visual representations $\{x_1, x_2, \ldots, x_n\}$. A positional encoding layer of the video encoder VE embeds information regarding relative positions of each token in the sequence of preliminary visual representations $\{x_1, x_2, \ldots, x_n\}$. The video encoder VE performs temporal reasoning over the sequence of preliminary visual representations $\{x_1, x_2, \ldots, x_n\}$, where each frame $X_n$ of the video VD, represented by a token $x_n$ of the sequence of preliminary visual representations, interacts with and attends to every other frame of the video VD via a self-attention mechanism of the video encoder VE. The video encoder VE outputs the sequence of contextualized visual representations $$\{\hat{x}_0, \hat{x}_1, \hat{x}_2, \ldots, \hat{x}_{n+1}\}: \{\hat{x}_i\}_{i=0}^{n+1} = VE(\{SOS, x_1, x_2, \ldots, x_n, EOS\}).$$

In some embodiments, the sequence of contextualized visual representations includes respective embeddings in the multi-modal embedding space.

TS denotes a transcript associated with the video VD, represented as a sequence of sentences, e.g., $T=\{S_1, S_2, \ldots, S_k\}$, where $S_k$ denotes a $k^{th}$ sentence of the transcript TS. The transcript TS includes a text transcription of audio included in the video VD. The video summarization model obtains the transcript TS from a user via the user interface, or by retrieving the transcript TS from the database.

According to some aspects, a sentence encoder SE (such as the sentence encoder described with reference to FIGS. 3 and 5-6) generates a sequence of preliminary text features $\{s_1, s_2, \ldots s_k\}$ (e.g., a sequence of embeddings) based on the transcript TS: $\{s_1, s_2, \ldots s_k\}=SE(\{S_1, S_2, \ldots S_k\})$. In some embodiments, the transcript TS is unavailable, and the sentence encoder SE generates the sequence of preliminary text features based on a MASK token input.

A text encoder TE (such as the text encoder described with reference to FIGS. 3 and 5-6) generates a sequence of text features $\{\hat{s}_1, \hat{s}_2, \ldots \hat{s}_k\}$ (e.g., a sequence of embeddings) based on the sequence of preliminary text features $\{s_1, S_2, \ldots s_k\}$: $\{\hat{s}_1, \hat{s}_2, \ldots \hat{s}_k\}=TE(\{s_1, s_2, \ldots s_k\})$. The sequence of text features $\{\hat{s}_1, \hat{s}_2, \ldots \hat{s}_k\}$ facilitates text-based contextual learning for video summarization.

A cross-modal attention component CMAtt (such as the cross-modal attention component described with reference to FIGS. 3 and 5-6) generates a sequence of text-conditioned visual features $$\{\hat{x}_i^{\hat{s}}\}_{i=0}^{n+1}$$

based on the sequence of contextualized visual representations $\{\hat{x}_0, \hat{x}_1, \hat{x}_2, \ldots, \hat{x}_{n+1}\}$ and the sequence of text features $\{\hat{s}_1, \hat{s}_2, \ldots \hat{s}_k\}$. The sequence of text-conditioned visual features $$\{\hat{x}_i^{\hat{s}}\}$$

captures inter-modal relationships between video and text inputs, thereby incorporating multi-modal cues for video summarization. In some embodiments, the sequence of text-conditioned visual features includes respective embeddings in the multi-modal embedding space.

The cross-modal attention component CMAtt uses the sequence of contextualized visual representations $\{\hat{x}_0, \hat{x}_1, \hat{x}_2, \ldots, \hat{x}_{n+1}\}$ as a query (Q) vector and the sequence of text features $\{\hat{s}_1, \hat{s}_2, \ldots \hat{s}_k\}$ as key (K) and value (V) vectors. The attention mechanism within each head of the cross-modal attention component CMAtt is defined as:

$$\text{head} = \text{Attention}(\hat{x}W^Q, \hat{s}W^K, \hat{s}W^V) \quad (3)$$

$$\text{Attention}(Q, K, V) = \text{softmax}\left(\frac{QK^T}{\sqrt{d_k}}\right)V \quad (4)$$

$\hat{x}$ denotes the sequence of contextualized visual representations, $\hat{s}$ denotes the sequence of text features, $W^Q$, $W^K$, and $W^V$ denote learned parameter matrices, and $\sqrt{d_k}$ is the size of K. The cross-modal attention component CMAtt generates the sequence of text-conditioned visual features $$\{\hat{x}_i^{\hat{s}}\}$$

using equation 5:

$$\{\hat{x}_i^{\hat{s}}\}_{i=0}^{n+1} = CMAtt(\{\hat{x}_i\}_{i=0}^{n+1}, \{\hat{s}_j\}_{j=1}^{k}) \quad (5)$$

At operation 815, the system generates, using a summary decoder of the video summarization model, a sequence of summary visual representations corresponding to a subset of the portions of the video based on the sequence of contextualized visual representations. In some cases, the operations of this step refer to, or may be performed by, a summary decoder as described with reference to FIGS. 3 and 5-6.

For example, the summary decoder generates the sequence of summary visual representations including a summary visual representation $\hat{y}_t$ of a frame of the video VD based on an input of the sequence of text-conditioned visual features $$\{\hat{x}_i^{\hat{s}}\}.$$

The summary decoder generates the sequence of summary visual representations using an autoregressive next summary representation prediction scheme. The next summary representation prediction scheme is similar to a next word prediction scheme used in natural language processing. For example, the summary decoder begins with the SOS token and takes a previously generated sequence of summary visual representations as input until the EOS token is decoded. The sequence of summary visual representations includes summary visual representations of one or more portions of the training video VD. In some embodiments, the sequence of summary visual representations includes respective embeddings in the multi-modal embedding space.

At operation 820, the system generates a summary video including the subset of the portions of the video based on the sequence of summary visual representations. In some cases, the operations of this step refer to, or may be performed by, a video summary generation component as described with reference to FIGS. 3 and 5.

For example, the video summary generation component uses nearest neighbor retrieval to match the sequence of summary visual representations to the sequence of preliminary visual representations $\{x_1, x_2, \ldots, x_n\}$, thereby selecting corresponding portions of the video VD, and temporarily aggregates the corresponding portions of the video VD to generate the summary video $v=\{Y_1, \ldots, Y_m\}$, where $v \cup V$ and $m<<n$. In some embodiments, the user interface provides the summary video v to the user via the user interface.

Accordingly, one or more aspects of the method include obtaining a video; generating, using a video encoder of a video summarization model, a sequence of contextualized visual representations corresponding to portions of the video; generating, using a summary decoder of the video summarization model, a sequence of summary visual representations corresponding to a subset of the portions of the video based on the sequence of contextualized visual representations; and generating a summary video including the subset of the portions of the video based on the sequence of summary visual representations. In some aspects, the video summarization model is trained using training data including a training video and a text summary of the training video.

Some examples of the method further include generating a sequence of preliminary visual representations based on the video, wherein the sequence of contextualized visual representations is generated based on the sequence of preliminary visual representations. In some examples, generating the summary video includes matching each of the sequence of summary visual representations to a corresponding portion of the subset of the portions of the video.

Some examples of the method further include obtaining a transcript of the video. Some examples further include generating a sequence of text features based on the transcript. Some examples further include generating a sequence of text-conditioned visual features based on the sequence of text features and the sequence of contextualized visual representations, wherein the sequence of summary visual representations is generated based on the sequence of text-conditioned visual features.

Training

FIG. 9 shows an example of a method 900 for updating parameters of a video summarization model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 9, according to some aspects, a video processing system trains a video summarization machine learning model to respectively encode a video to obtain features for the video and decode the features of the video to obtain features for a summary video.

Conventional video processing systems use a binary classifier model to classify each frame of a video as being either a summary moment or a non-summary moment. Such an approach is inaccurate both because it suffers from a long-tail distribution problem characterized by a significant class imbalance, as a number of summary moments in a video is considerably smaller compared to non-summary moments, and because the prediction of whether a video frame of a sequence of video frames is a summary moment or a non-summary moment is made independently of how previous video frames of the sequence of video frames have been classified, potentially leading to numerous repetitive video frames being categorized as summary moments.

By contrast, according to some aspects, the video summarization model is trained to use a regression-based approach of decoding continuous feature representations of summary moments of a video, thereby mitigating the long-tail distribution problem. Furthermore, in some embodiments, the video summarization model is trained to use an autoregressive decoding process in which decoding of a representation at a given time step t of the video is conditioned on representations previously decoded up to time t−1 of the video, allowing the video summarization model to learn intricate contextual dependencies between frames of the video and therefore increase an accuracy of the video summarization model's identification of the summary video.

Furthermore, in some embodiments, the video summarization model is trained based on a transcript of a video, which allows the video summarization model to understand both visual and textual cues for the video, further increasing an accuracy of the predictions of the video summarization model.

At operation 905, the system obtains a training set including a training video and a target summary video. In some cases, the operations of this step refer to, or may be performed by, a training component as described with reference to FIGS. 3 and 6-7. In some embodiments, the training component receives the training set from a user. In some embodiments, the training component retrieves the training set from a database (such as a database described with reference to FIG. 1).

In some embodiments, the training component obtains a transcript of the training video (e.g., from the user or from the database). Additionally or alternatively, the training component generates the transcript based on the training video (e.g., using a speech-to-text algorithm). According to some aspects, the training component respectively generates embeddings of the transcript and the training video using a multi-modal encoder (such as the multi-modal encoder described with reference to FIGS. 3 and 5-7). In some embodiments, the training component rejects the training video if a distance between the respective embeddings of the transcript and the training video exceeds a threshold distance. In some embodiments, the training component prepends a timestamp before each sentence of the transcript, where the timestamp corresponds to a time of the training video.

According to some aspects, the training component obtains a text summary of the transcript. In some embodiments, the training component receives the text summary from the user or retrieves the text summary from the database. Additionally or alternatively, a language model (such as the language model described with reference to FIGS. 3 and 7) generates the text summary. In some embodiments, the training component provides a prompt to the language model. In some embodiments, the language model generates the text summary based on the prompt. The prompt may include the transcript and an instruction to generate the text summary based on the transcript by extracting one or more representative, important, and or informative sentences from the transcript (and, in some cases, by extracting one or more timestamps corresponding to the extracted sentences). The timestamp of the transcript provides a temporal context for the language model, facilitating efficient prompting.

The prompt may include an instruction to preserve the original wording of the extracted sentences, e.g., a text string such as "I am providing you with a transcribed narration from a video, complete with timestamps. Please generate an extractive summary from this text. Here are your instructions: 1. The summary should consist of only the most critical and informative moments from the video. 2. Do not paraphrase or reword the sentences. Maintain their original wording. 3. Each sentence you extract for the summary must include its original timestamp." In some embodiments, the language model generates a set of text summaries based on a set of transcripts.

According to some aspects, the training component generates the target summary video based on the text summary. The training component may identify each portion of the training video corresponding to each sentence included in the text summary using each start and/or end timestamp included in the text summary. In some embodiments, the multi-modal encoder generates respective embeddings of the text summary and the training video. The training component may perform a nearest neighbor search, using the embedding of the training video, for nearby frames of the training video within each identified portion of the training video, thereby mitigating any potential timestep misalignment. The training component temporally aggregates each identified portion of the training video to generate the target summary video. The training component likewise generates a set of target summary videos based on a set of training videos and a corresponding set of text summaries.

Accordingly, the video processing system can provide a scalable, multi-modal mechanism that takes advantage of the language model's ability to generate accurate extractive summaries of the set of transcripts to generate the set of target summary videos. The set of target summary videos may therefore be of a sufficient size to be suitable for use in training a video summarization model.

At operation 910, the system generates, using a video encoder of a video summarization model, a sequence of contextualized visual representations corresponding to portions of the training video. In some cases, the operations of this step refer to, or may be performed by, a video encoder as described with reference to FIGS. 3 and 5-6.

For example, a multi-modal encoder MME (such as the multi-modal encoder described with reference to FIGS. 3 and 5-6) generates a sequence of preliminary visual representations $\{x_1, x_2, \ldots, x_n\}$ based on the training video VD=$\{X_1, X_2, \ldots, X_n\}$: $\{x_1, x_2, \ldots, x_n\}$= MME ($\{X_1, X_2, \ldots, X_n\}$). The sequence of preliminary visual representations includes respective visual embeddings of each frame of the training video VD in a multi-modal embedding space. Generating the sequence of preliminary visual representations may comprise a visual tokenization of the training video VD. The sequence of preliminary visual representations may include a start-of-sequence (SOS) token to mark the beginning of the sequence and an end-of-sequence (EOS) token to mark the end of the sequence.

The video encoder (VE) receives the sequence of preliminary visual representations $\{x_1, x_2, \ldots, x_n\}$. A positional encoding layer of the video encoder VE embeds information regarding relative positions of each token in the sequence of preliminary visual representations $\{x_1, x_2, \ldots, x_n\}$. The video encoder VE performs temporal reasoning over the sequence of preliminary visual representations $\{x_1, x_2, \ldots, x_n\}$, where each frame $X_n$ of the training video VD, represented by a token $x_n$ of the sequence of preliminary visual representations, interacts with and attends to every other frame of the training video TVD via a self-attention mechanism of the video encoder VE. The video encoder VE outputs a sequence of contextualized visual representations $$\{\hat{x}_0, \hat{x}_1, \hat{x}_2, \ldots, \hat{x}_{n+1}\}: \{\hat{x}_i\}_{i=0}^{n+1} = VE(\{SOS, x_1, x_2, \ldots, x_n, EOS\}).$$

In some embodiments, the sequence of contextualized visual representations includes respective embeddings in the multi-modal embedding space.

TS denotes a transcript associated with the training video VD, represented as a sequence of sentences, e.g., T=$\{S_1, S_2, \ldots S_k\}$, where $S_k$ denotes a $k^{th}$ sentence of the transcript TS. The transcript TS includes a text transcription of audio included in the training video VD. The video summarization model may obtain the transcript TS from a user via the user interface or by retrieving the transcript TS from the database. In some embodiments, the training component randomly masks the transcript TS by replacing one or more words included in the transcript with a MASK token. Masking the transcript TS allows the video summarization model to learn to generate a sequence of summary visual representations for a video when a transcript corresponding to the video is unavailable.

A sentence encoder SE (such as the sentence encoder described with reference to FIGS. 3 and 5-6) generates a sequence of preliminary text features $\{s_1, s_2, \ldots s_k\}$ (e.g., a sequence of embeddings) based on the transcript TS: $\{s_1, S_2, \ldots s_k\}$=SE ($\{S_1, S_2, \ldots S_k\}$).

A text encoder TE (such as the text encoder described with reference to FIGS. 3 and 5-6) generates a sequence of text features $\{\hat{s}_1, \hat{s}_2, \ldots \hat{s}_k\}$ (e.g., a sequence of embeddings) based on the sequence of preliminary text features $\{s_1, S_2, \ldots s_k\}$: $\{\hat{s}_1, \hat{s}_2, \ldots \hat{s}_k\}$=TE ($\{s_1, s_2, \ldots s_k\}$). The sequence of text features $\{\hat{s}_1, \hat{s}_2, \ldots \hat{s}_k\}$ facilitates text-based contextual learning for video summarization.

A cross-modal attention component CMAtt (such as the cross-modal attention component described with reference to FIGS. 3 and 5-6) generates a sequence of text-conditioned visual features $$\{\hat{x}_i^{\hat{s}}\}_{i=0}^{n+1}$$

based on the sequence of contextualized visual representations $\{\hat{x}_0, \hat{x}_1, \hat{x}_2, \ldots, \hat{x}_{n+1}\}$ and the sequence of text features $\{\hat{s}_1, \hat{s}_2, \ldots \hat{s}_k\}$. The sequence of text-conditioned visual features $$\{\hat{x}_i^{\hat{s}}\}$$

captures the inter-modal relationships between video and text inputs, thereby incorporating multi-modal cues for video summarization. In some embodiments, the sequence of text-conditioned visual features includes respective embeddings in the multi-modal embedding space.

The cross-modal attention component CMAtt uses the sequence of contextualized visual representations $\{\hat{x}_0, \hat{x}_1, \hat{x}_2, \ldots, \hat{x}_{n+1}\}$ as a query (Q) vector and the sequence of text features $\{\hat{s}_1, \hat{s}_2, \ldots \hat{s}_k\}$ as key (K) and value (V) vectors. The attention mechanism within each head of the cross-modal attention component CMAtt is defined as:

$$\text{head} = \text{Attention}(\hat{x}W^Q, \hat{s}W^K, \hat{s}W^V) \tag{6}$$

$$\text{Attention}(Q, K, V) = \text{softmax}\left(\frac{QK^T}{\sqrt{d_k}}\right)V \tag{7}$$

$\hat{x}$ denotes the sequence of contextualized visual representations, $\hat{s}$ denotes the sequence of text features, $W^Q$, $W^K$, and $W^V$ denote learned parameter matrices, and $\sqrt{d_k}$ is the size of K. The cross-modal attention component CMAtt generates the sequence of text-conditioned visual features $$\{\hat{x}_i^{\hat{s}}\}$$

using equation 8:

$$\{\hat{x}_i^{\hat{s}}\}_{i=0}^{n+1} = CMAtt(\{\hat{x}_i\}_{i=0}^{n+1}, \{\hat{s}_j\}_{j=1}^{k}) \tag{8}$$

At operation 915, the system generates a sequence of target visual representations of the target summary video. In some cases, the operations of this step refer to, or may be performed by, a multi-modal encoder as described with reference to FIGS. 3 and 5-7.

For example, the multi-modal encoder MME generates the sequence of target visual representations $\{y_1, y_2 \ldots, y_m\}$ of the target summary video $\{Y_1, Y_2, \ldots, Y_m\}$, where $Y_m$ is an $m^{th}$ frame of the target summary video: $\{y_1, y_2 \ldots, y_m\}$=MME $(\{Y_1, Y_2, \ldots, Y_m\})$. In some embodiments, the sequence of target visual representations includes respective embeddings in the multi-modal embedding space.

At operation 920, the system generates, using a summary decoder of the video summarization model, a sequence of summary visual representations corresponding to a subset of the portions of the training video based on the sequence of contextualized visual representations. In some cases, the operations of this step refer to, or may be performed by, a summary decoder as described with reference to FIGS. 2, 4, and 8.

The summary decoder SD generates the sequence of summary visual representations $\{\hat{y}_1, \hat{y}_2 \ldots, \hat{y}_m\}$ including a summary visual representation $\hat{y}_t$ of a frame of the training video VD based on the sequence of text-conditioned visual features $$\{\hat{x}_i^{\hat{s}}\}$$

and the sequence of target visual representations $\{y_1, y_2 \ldots, y_m\}$ up to a time step t−1, thereby accounting for previously selected summary visual representations included in the sequence of summary visual representations when choosing a next frame $\hat{y}_t$ to include in the sequence of summary visual representations:

$$\hat{y}_t = SD(\{\hat{x}_i^{\hat{s}}\}_{i=0}^{n+1}, \{SOS, y_1, \ldots, y_{t-1}\}).$$

The summary decoder SD may generate the sequence of summary visual representations using an autoregressive next summary representation prediction scheme. In some embodiments, the next summary representation prediction scheme is similar to a next word prediction scheme used in natural language processing. In an example, the summary decoder begins with the SOS token and takes a previously generated sequence of summary visual representations as input until the EOS token is decoded. The sequence of summary visual representations includes summary visual representations of one or more portions of the training video VD. In some embodiments, the sequence of summary visual representations includes respective embeddings in the multi-modal embedding space.

At operation 925, the system updates parameters of the video summarization model based on the sequence of summary visual representations and the sequence of target visual representations. In some cases, the operations of this step refer to, or may be performed by, a training component as described with reference to FIGS. 3 and 6-7.

For example, the training component computes a feature reconstruction loss $\mathcal{L}$ based on a comparison of the sequence of summary visual representations $\{\hat{y}_1, \hat{y}_2 \ldots, \hat{y}_m\}$ and the sequence of target visual representations $\{y_1, y_2 \ldots, y_m\}$:

$$\mathcal{L} = \sum_{i=1}^{m+1} |\hat{y}_i - y_i|^2 \tag{9}$$

A loss function refers to a function that impacts how a machine learning model is trained in a supervised learning model. For example, during each training iteration, the output of the machine learning model is compared to the known annotation information in the training data. The loss function provides a value (the "loss", e.g., the feature reconstruction loss) for how close the predicted annotation data is to the actual annotation data. After computing the loss, the parameters of the model are updated accordingly and a new set of predictions are made during the next iteration.

Supervised learning is a machine learning technique based on learning a function that maps an input to an output based on example input-output pairs. Supervised learning generates a function for predicting labeled data based on labeled training data consisting of a set of training examples. Each example may be a pair consisting of an input object (e.g., a vector) and a desired output value (e.g., a single value or an output vector). In some embodiments, a supervised learning algorithm analyzes the training data and produces the inferred function, which can be used for mapping new examples. The learning results in a function that correctly determines the class labels for unseen instances. The learning algorithm may generalize from the training data to unseen examples. According to some aspects, the training component updates image generation parameters of the image generation model based on the loss.

According to some aspects, the training component updates the parameters of the video summarization model based on the feature reconstruction loss. In some embodiments, the training component freezes at least one of the multi-modal encoder and the sentence encoder during training (e.g., in some cases, the training component does not update parameters of at least one of the multi-modal encoder and the sentence encoder during training).

Accordingly, one or more aspects of the method include obtaining a training set comprising a training video and a target summary video; generating, using a video encoder of a video summarization model, a sequence of contextualized visual representations corresponding to portions of the training video; generating a sequence of target visual representations of the target summary video; generating, using a summary decoder of the video summarization model, a sequence of summary visual representations corresponding to a subset of the portions of the training video based on the sequence of contextualized visual representations; and updating parameters of the video summarization model based on the sequence of summary visual representations and the sequence of target visual representations.

In some examples, obtaining the training set includes obtaining a text summary of the training video. In some examples, obtaining the training set further includes generating the target summary video based on the text summary. In some examples, obtaining the training set includes obtaining a transcript of the training video. In some examples, obtaining the training set further includes generating, using a language model, the text summary based on the transcript.

In some examples, generating the target summary video includes matching portions of the text summary to portions of the training video. In some examples, generating the target summary video further includes including the matched portions of the training video in the target summary video. Some examples of the method further include generating a sequence of preliminary visual representations based on the training video, wherein the portions of the text summary are matched to the portions of the training video based on the sequence of preliminary visual representations.

Some examples of the method further include computing a feature reconstruction loss based on a comparison of the sequence of summary visual representations and the sequence of target visual representations, wherein the parameters of the summary decoder are updated based on the feature reconstruction loss. Some examples of the method further include generating a sequence of preliminary visual representations based on the training video, wherein the sequence of contextualized visual representations is generated based on the sequence of preliminary visual representations.

Some examples of the method further include obtaining a transcript of the video. Some examples further include generating a sequence of text-conditioned visual features based on the transcript and the sequence of contextualized visual representations, wherein the sequence of summary visual representations is generated based on the sequence of text-conditioned visual features.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for video processing, comprising:

obtaining a video;

generating, using a video encoder of a video summarization model, a sequence of contextualized visual representations corresponding to portions of the video, wherein the sequence of contextualized visual representations comprises a sequence of embeddings of the corresponding portions of the video in a vector space;

generating, using a summary decoder of the video summarization model, a sequence of summary visual representations corresponding to a subset of the portions of the video based on the sequence of contextualized visual representations using an autoregressive prediction scheme; and generating a summary video including the subset of the portions of the video based on the sequence of summary visual representations.

2. The method of claim 1, further comprising:

generating a sequence of preliminary visual representations based on the video, wherein the sequence of contextualized visual representations is generated based on the sequence of preliminary visual representations.

3. The method of claim 2, wherein generating the summary video comprises:

matching each of the sequence of summary visual representations to a corresponding portion of the subset of the portions of the video.

4. The method of claim 1, further comprising:

obtaining a transcript of the video;

generating a sequence of text features based on the transcript; and generating a sequence of text-conditioned visual features based on the sequence of text features and the sequence of contextualized visual representations, wherein the sequence of summary visual representations is generated based on the sequence of text-conditioned visual features.

5. The method of claim 1, wherein:

the video summarization model is trained using training data including a training video and a text summary of the training video.

6. A method for training a machine learning model, comprising:

obtaining a training set comprising a training video and a target summary video;

generating, using a video encoder of a video summarization model, a sequence of contextualized visual representations corresponding to portions of the training video, wherein the sequence of contextualized visual representations comprises a sequence of embeddings of the corresponding portions of the video in a vector space;

generating a sequence of target visual representations of the target summary video;

generating, using a summary decoder of the video summarization model, a sequence of summary visual representations corresponding to a subset of the portions of the training video based on the sequence of contextualized visual representations using an autoregressive prediction scheme; and updating parameters of the video summarization model based on the sequence of summary visual representations and the sequence of target visual representations.

7. The method of claim 6, wherein obtaining the training set comprises:

obtaining a text summary of the training video; and generating the target summary video based on the text summary.

8. The method of claim 7, wherein obtaining the training set comprises:

obtaining a transcript of the training video; and generating, using a language model, the text summary based on the transcript.

9. The method of claim 7, wherein generating the target summary video comprises:

matching portions of the text summary to portions of the training video; and including the matched portions of the training video in the target summary video.

10. The method of claim 9, further comprising:

generating a sequence of preliminary visual representations based on the training video, wherein the portions of the text summary are matched to the portions of the training video based on the sequence of preliminary visual representations.

11. The method of claim 6, further comprising:

computing a feature reconstruction loss based on a comparison of the sequence of summary visual representations and the sequence of target visual representations, wherein the parameters of the summary decoder are updated based on the feature reconstruction loss.

12. The method of claim 6, further comprising:

generating a sequence of preliminary visual representations based on the training video, wherein the sequence of contextualized visual representations is generated based on the sequence of preliminary visual representations.

13. The method of claim 6, further comprising:

obtaining a transcript of the training video; and generating a sequence of text-conditioned visual features based on the transcript and the sequence of contextualized visual representations, wherein the sequence of summary visual representations is generated based on the sequence of text-conditioned visual features.

14. An apparatus for video processing, comprising:

at least one processor;

at least one memory storing instructions executable by the at least one processor; and a video summarization model comprising parameters stored in the at least one memory, wherein the video summarization model is trained to generate a sequence of contextualized visual representations corresponding to portions of a video and to generate a sequence of summary visual representations corresponding to a subset of the portions of the video based on the sequence of contextualized visual representations using an autoregressive prediction scheme, wherein the sequence of contextualized visual representations comprises a sequence of embeddings of the corresponding portions of the video in a vector space.

15. The apparatus of claim 14, further comprising:

a video summary generation component configured to generate a summary video including the subset of the portions of the video based on the sequence of summary visual representations.

16. The apparatus of claim 14, wherein:

the video summarization model comprises a video encoder trained to generate the sequence of contextualized visual representations.

17. The apparatus of claim 14, wherein:

the video summarization model comprises a summary decoder trained to generate a sequence of summary visual representations corresponding to a subset of the portions of the video based on the sequence of contextualized visual representations.

18. The apparatus of claim 14, wherein:

the video summarization model comprises a text encoder trained to generate a sequence of text features based on a transcript.

19. The apparatus of claim 14, wherein:

the video summarization model comprises a cross-modal attention component trained to generate a sequence of text-conditioned visual features based on a sequence of text features and a sequence of contextualized visual representations.

20. The apparatus of claim 14, further comprising:

a multi-modal encoder trained to generate a sequence of preliminary visual representations based on the video.

* * * * *